(12) United States Patent
Briscoe et al.

(10) Patent No.: US 7,426,471 B1
(45) Date of Patent: Sep. 16, 2008

(54) COMMUNICATIONS NETWORK

(75) Inventors: Robert J Briscoe, Suffolk (GB);
Michael Rizzo, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/674,720

(22) PCT Filed: Jun. 4, 1999

(86) PCT No.: PCT/GB99/01773
§ 371 (c)(1),
(2), (4) Date: Nov. 6, 2000

(87) PCT Pub. No.: WO99/65185
PCT Pub. Date: Dec. 16, 1999

(30) Foreign Application Priority Data

| Jun. 5, 1998 | (GB) | 9812161.9 |
| Nov. 24, 1998 | (EP) | 98309609 |
| Nov. 24, 1998 | (GB) | 9825723.1 |
| Jan. 29, 1999 | (GB) | 9902052.1 |
| Feb. 5, 1999 | (GB) | 9902648.6 |

(51) Int. Cl.
*G06Q 10/00* (2006.01)
(52) U.S. Cl. .............. 705/1; 705/52; 379/63
(58) Field of Classification Search ........ 705/1, 705/52; 379/63
See application file for complete search history.

(56) References Cited

U.S. PATENT DOCUMENTS

| 4,756,019 A | 7/1988 | Szybicki | |
| 4,796,297 A | 1/1989 | Okamoto | |
| 4,896,319 A * | 1/1990 | Lidinsky et al. ............. 370/427 |
| 5,067,149 A * | 11/1991 | Schneid et al. ......... 379/265.03 |
| 5,303,297 A * | 4/1994 | Hillis ......................... 455/406 |
| 5,440,547 A | 8/1995 | Easki et al. | |
| 5,631,897 A | 5/1997 | Pacheco et al. | |
| 5,751,799 A * | 5/1998 | Mori ..................... 379/114.09 |
| 5,956,331 A | 9/1999 | Rautiola et al. | |
| 5,970,126 A * | 10/1999 | Bowater et al. ........ 379/114.21 |
| 5,978,456 A | 11/1999 | Takeuchi et al. | |
| 5,982,754 A | 11/1999 | Itou et al. | |
| 6,005,926 A * | 12/1999 | Mashinsky ............. 379/114.02 |
| 6,032,132 A | 2/2000 | Nelson | |
| 6,047,051 A * | 4/2000 | Ginzboorg et al. .......... 379/130 |
| 6,088,659 A | 7/2000 | Kelley et al. | |
| 6,098,878 A | 8/2000 | Dent et al. | |

(Continued)

FOREIGN PATENT DOCUMENTS

DK 4241434 A1 * 6/1994

(Continued)

OTHER PUBLICATIONS

Johnson, Johna Till; "Cisco Serves Up a Wealth of Functions"; Data Communications; May 21, 1992; 21; 8; ABI/INFORM Global; pp. 41-42.*

(Continued)

*Primary Examiner*—Naresh Vig
(74) *Attorney, Agent, or Firm*—Nixon & Vanderhye P.C.

(57) ABSTRACT

In a communications network, loading of network resources is detected locally at a customer terminal, and a tariff for network usage is varied automatically depending on the usage.

23 Claims, 15 Drawing Sheets

U.S. PATENT DOCUMENTS

| | | | | | |
|---|---|---|---|---|---|
| 6,108,330 | A | * | 8/2000 | Bhatia et al. | 370/352 |
| 6,118,768 | A | * | 9/2000 | Bhatia et al. | 370/254 |
| 6,128,601 | A | * | 10/2000 | Van Horne et al. | 705/34 |
| 6,144,727 | A | * | 11/2000 | Mashinsky | 379/114.02 |
| 6,154,445 | A | * | 11/2000 | Farris et al. | 370/237 |
| 6,226,365 | B1 | * | 5/2001 | Mashinsky | 379/114.02 |
| 6,246,870 | B1 | * | 6/2001 | Dent et al. | 455/405 |
| 6,292,466 | B1 | | 9/2001 | Droz | |
| 6,324,522 | B2 | * | 11/2001 | Peterson et al. | 705/28 |
| 6,338,046 | B1 | | 1/2002 | Saari et al. | |
| 6,351,737 | B1 | * | 2/2002 | Williams | 705/34 |
| 6,408,174 | B1 | | 6/2002 | Steijer | |
| 6,430,275 | B1 | | 8/2002 | Voit et al. | |
| 6,452,588 | B2 | * | 9/2002 | Griffin et al. | 345/169 |
| 6,480,470 | B1 | | 11/2002 | Breivik | |
| 6,504,918 | B1 | * | 1/2003 | Herling | 379/93.12 |
| 6,542,588 | B1 | * | 4/2003 | Mashinsky | 379/114.02 |
| 6,625,657 | B1 | | 9/2003 | Bullard | |
| 6,667,956 | B2 | | 12/2003 | Beshai et al. | |
| 6,671,285 | B1 | * | 12/2003 | Kirkby et al. | 370/468 |
| 6,714,979 | B1 | * | 3/2004 | Brandt et al. | 709/225 |
| 6,856,598 | B1 | * | 2/2005 | Stanfield | 370/235 |
| 6,973,038 | B1 | | 12/2005 | Narendran | |
| 2001/0051951 | A1 | | 12/2001 | Nishikawa | |
| 2002/0091574 | A1 | | 7/2002 | Lefebvre et al. | |
| 2003/0154174 | A1 | | 8/2003 | Tassel et al. | |
| 2004/0024717 | A1 | | 2/2004 | Sneeringer | |

FOREIGN PATENT DOCUMENTS

| | | | |
|---|---|---|---|
| DK | 0917336 A2 | * | 5/1999 |
| EP | 0622941 A2 | | 11/1994 |
| EP | 0647055 A1 | | 4/1995 |
| EP | 0734144 A2 | | 3/1996 |
| EP | 0837578 A | | 4/1998 |
| EP | 0917336 A2 | | 5/1999 |
| GB | 2311439 | | 9/1997 |
| WO | WO 95/27385 | | 10/1995 |
| WO | WO 97/05749 | | 2/1997 |
| WO | WO 9723084 A1 | * | 6/1997 |
| WO | WO 98/02828 | | 1/1998 |
| WO | 98/58474 | | 12/1998 |
| WO | 99/65183 | | 12/1999 |
| WO | 01/69453 A1 | | 9/2001 |

OTHER PUBLICATIONS

Hannington, Stephen; "Price Cuts and New Lines to Catch the Customers"; The Times; London (UK); Nov. 17, 1997; pp. 1-3.*

Anonymous; "Lucent Delivers High-Capicity Optical Networking Equipment to Increase Bandwidth on NTT's Network"; Fiber Optics Weekly Update; Boston; Jun. 5, 1998, vol. 18; Issue 23; pp. 6; 2 Pages.*

Lim, Wendy; Call to Operators on Roaming Services; [Shipping Times Edition]; Business Times; Kuala Lumipur; Jun. 5, 1998, pp. 1; 2 Pages.*

Iwata et al., ATM Connection And Traffic Management Schemes For Multimedia Internetworking, Feb. 1995, Communications of the ACM, v38n2, pp. 72-89.*

SARs Set To Cut And Paste ATM data, Feb. 13, 1995, Electronic Engineering Times, p. 58.*

Sietmann, "Tarifmodelle Gegen Staus Auf Der Infobahn", Funkschau, vol. 71, No. 8, Apr. 3, 1998, pp. 28-30, XP000779238.

Murphy et al, "Distributed Pricing For Emb edded ATM Networks", Fundamental Role of Teletraffic in the Evolution of Telecommunication Networks, Proceesdings of the 14$^{th}$ International Teletraffic Congress—ITC 1, Juan-Lees-Pins, Jun. 6-10, 1994, No. 1B, Jun. 6, 1994, pp. 1053-1063, XP 000593354.

Kaltenmorgen, Kleinewillinghofer-Kopp: "Verkehrskontrolle in ATM-Netzen", Der Fernmelde Ingenieur, vol. 46, No. 1, Jan. 1992, pp. 1-33, XP000407119.

Estrin et al, "Design Considerations for Usage Accounting and Feedback in Internetworks", Computer Communications Review, vol. 20, No. 5, Oct. 1, 1990, pp. 56-66, XP000167877.

Mackie-Mason et al, "Pricing Congestible Network Resources", IEEE Journal on Selected Areas in Communications, vol. 13, No. 7, Sep. 1, 1995, pp. 1141-1149, XP000577206.

Murphy et al, "Feedback and Efficiency in ATM Networks", 1996 IEEE International Conference on Communications (ICC), Converging Technologies for Tomorrow's Applications, Dallas, Jun. 23-27, 1996, vol. 2, pp. 1045-1049, XP000625931, Institute of Electrical & Electronics Engineers.

Hidano, "A Practical and Economical Approach to Resource Allocation", 1997 IEEE 47$^{TH}$ Vehicular Technology Conference, Phoenix, May 4-7, 1997, vol. 3, No. Conf. 47, Nov. 18, 1996, pp. 1107-1113, XP000741599.

Clark, "A Model for Cost Allocation and Pricing in the Internet", MIT Workshop on Internet Economics, Mar. 1995 , XP 002102708.

Nishibe et al, "Distributed Channel Allocation in ATM Networks", Proceedings of the Global Telecommunications Conference (GLOBECOM), Houston, Nov. 29, 1993, pp. 417-423 XP000428091.

Sloman et al, "Domain Management and Accounting in an International Cellular Network", BNSDOCID:<XP 199363 A, Apr. 1993, pp. 193-204.

Appleton, "Performance Related Issues Concerning the Contract Between Network and Customer in ATM Networks", Telecommunication Access Networks: Technology and Service Trends Proceedings of The IX International Symposium on Subcriber Loops and Services (ISSLS), Amsterdam, Apr. 22-26, 1991, No. Symp. 9, pp. 182-188, XP000516590.

Honig, M.L., et al., Usage-based Pricing of Packet Data Generated by a Heterogeneous User Population, INFOCOM '95, Fourteenth Annual Joint Conference of the IEEE Computer and Communication Societies, Apr. 1995, pp. 867-874, vol. 2.

Johnson, Johna Till; "Cisco Serves Up a Wealth of Functions"; Data Communications; May 21, 1992; 21; 8; ABI/INFORM Global; pp. 41-42.

Hannington, Stephen; "Price Cuts and New Lines to Catch the Customers"; The Times; London (UK); Nov. 17, 1997; pp. 1-3.

Anonymous; "Lucent Delivers High-Capacity Optical Networking Equipment to Increase Bandwidth on NTT's Network"; Fiber Optics Weekly Update; Boston; Jun. 5, 1998, vol. 18; Issue 23; pp. 6; 2 pages.

Lim, Wendy; "Call to Operators on Roaming Services"; [Shipping Times Edition]; Business Times; Kuala Lumpur; Jun. 5, 1998; pp. 1; 2 pages.

Bowman, C. Douglas; "Innovative Rates: Four Customers, Four Solutions"; Jan. 15, 1996; Public Utilities Fortnightly; v134n2; pp. 25-29.

Ruth et al.; "Usage-Based Cost Recovery In Internetworks"; Business Communications Review, US, Hinsdale, IL, vol. 22, No. 7, Jul. 1, 1992, pp. 38-42; XP000577637.

U.S. Appl. No. 09/674,717, filed Nov. 6, 2000 including Office Action mailed Jan. 3, 2007 and Applicant Response filed Jun. 4, 2007.

U.S. Appl. No. 09/674,706, filed Nov. 6, 2000 including Office Action mailed Jun. 13, 2006 and Applicant Response filed Sep. 13, 2007.

* cited by examiner

| | |
|---|---|
| BTInternet Internet Accounting Control Platform | _ □ x |
| Local Platform ID | BTInternet |
| Local Meter ID | local |
| Local Reporting Rate | 1000 |
| Reporting Source | [ ] Add  Remove |

| Demon | Report NOW! |
| MCI | Required Reporting Rate |
| BTInternet | 2000 |
| | Reporting Phase |
| | [ ] |
| | ☐ Reporting priced data |
| | Security |
| | ☐ Encryption required |
| | ☐ Digital signing Required |
| | Update |

COMMUNICATIONS NETWORK

BACKGROUND TO THE INVENTION

The present invention relates to a communications network, and in particular to charging mechanisms in such a network. It includes aspects of the inventions disclosed and claimed in the present applicant's co-pending British patent application no. 9812161.9 filed 5 Jun. 1998 (applicant's ref: A25547) and the contents of that earlier application are incorporated herein by reference.

In conventional communications networks, such as national PSTNs (public switched telephone networks), a significant proportion of the network resources are devoted to metering and billing network usage. Studies have estimated these resources as consuming as much as 6% of the revenue of a telecommunications company. The Internet, by contrast, does not in general incorporate metering and billing mechanisms for individual customers. The absence of the network infrastructure required to support metering and billing reduces the operational costs of the Internet compared to conventional telephony networks, and has facilitated the rapid expansion of the Internet. However, the absence of appropriate billing mechanisms has significant disadvantages in terms of the characteristics of the traffic carried by the Internet: it encourages profligate use of network resources, and diminishes the incentive for investment in network infrastructure to support new applications requiring, e.g., guaranteed quality of service (QoS).

SUMMARY OF THE INVENTION

According to a first aspect of the present invention, there is provided a method of operating a communications network, including automatically varying, depending on network loading as detected at a customer terminal, a tariff for network usage by the customer terminal.

In this document references to varying a tariff encompass changing a price, e.g. as a function of a congestion parameter. The structure of the tariff may be unchanged.

The present invention provides an approach to charging for network usage which involves little or no network overheads, and which moreover is able to reflect local variations in network loading. This is achieved by detecting a measure of network loading at the customer terminal. This measure will reflect those resources being used by the customer terminal at a particular time. For example, in a federated data network comprising a number of sub-domains, such as the Internet, a customer terminal in one subdomain may attempt to access a server in another subdomain at a time when there is overloading of a router somewhere in the path from the customer terminal to the server. Then, even if average loading of the network as a whole is low, the loading as perceived by the customer terminal is high, and a tariff for use of the network by the customer terminal is increased to reflect the scarcity of the relevant network resources. Similarly other terminals attempting to access data via the same router will also perceive the network loading as being high, and will also have their tariffs increased accordingly. With an appropriately steep rise in tariff, at least some customer terminals will then choose to abandon or defer their attempts to use the network resource in question, thereby relieving the loading of the router.

This aspect of the invention may be used in systems in which the end user is merely informed of the price and accounting and billing is carried out by the network provider, also in systems where the end user measures their usage and supplies this information to the network provider, and also in systems where the end user both measures their usage and calculates the payment due to the network provider.

The method may include detecting at the customer terminal a network performance parameter which depends on network loading, and varying the tariff depending on the network performance parameter. When the network is a packet network, then the network performance parameter may be the number of packets lost in transmission between a data source and the customer terminal. This approach has the advantage that it is suitable for implementation using existing congestion control mechanisms in packet networks. For example, in the Internet, routers respond to congestion by dropping packets, and a customer terminal using TCP (Transport Control Protocol) detects packet loss and controls a congestion window at the terminal accordingly. The present invention may use the detected packet loss to trigger an increase in the tariff applicable to the terminal. This may be accompanied by the signalling of congestion by the receiving terminal to the data source.

In an alternative and preferred approach, when congestion is detected within the network an explicit congestion signal may be generated and transmitted to the customer terminal, and the receipt of the explicit congestion signal at the customer terminal may then trigger the increase in the tariff. This approach has the advantage that an appropriate congestion signal may be generated in advance of significant degradation in network performance occurring, making it easier to maintain a required quality of service. Preferably the explicit congestion signal is carried with a data packet on the communications network. Preferably a router in the network writes an explicit congestion signal in a packet when congestion is detected at the router.

As a further alternative, the congestion notification signal may be a source quench signal generated at the router and transmitted back to the data source.

Preferably there is a non-linear relationship between the increase in tariff and the detected network loading. Preferably the method includes making a first relatively smaller increase in the tariff when congestion is first detected, and making at least one further, relatively larger increase, if the congestion persists. This behaviour may be pre-programmed into the tariff algorithm. In this way oscillatory behaviour of the network can be avoided, while ensuring that a sufficient increase is made to have a desired impact on the demand for network resources.

Preferably the method includes programming a decision agent at the customer terminal with user-determined price criteria, and comparing a price calculated using the tariff with the said price criteria. For example, the decision agent might be programmed to proceed with data communications as long as a per-packet charge is zero or is less than a predetermined threshold. Then if congestion causes the charge to rise above that threshold, the data communication is interrupted and the decision agent modifies the operation of the customer terminal. For example the decision agent may slow down communications once the cost threshold is exceeded. The user may then choose to continue with the communication, or may elect to abandon the attempt to access data from a particular source. The decision agent may be programmed with rules which relate to an overall price for multiple simultaneous transmissions and which accord different weights to different respective applications.

Preferably the method includes distributing a tariff algorithm via the communications network to a plurality of terminals and calculating at each terminal using the tariff a charge for network usage by the terminal. In this case preferably the method includes steps, carried out by a network operator, of intermittently sampling traffic between a customer terminal and the network, and as part of the sampling recording network loading affecting the customer terminal; for the sampled traffic comparing a charge calculated by the customer terminal and an expected charge and detecting thereby any discrepancy.

The step of recording network loading may involve, for example, recording packet drops, or explicit congestion notification (ECN) bits or source quench messages.

The invention also encompasses a network operating by a method in accordance with the first aspect of the invention, and customer terminals, network routers and other network nodes for use in such a network.

DESCRIPTION OF DRAWINGS

Systems embodying the present invention will now be described in further detail, by way of example only, with reference to the accompanying drawings, in which.

DESCRIPTION OF EXEMPLARY EMBODIMENTS

Figure 1:
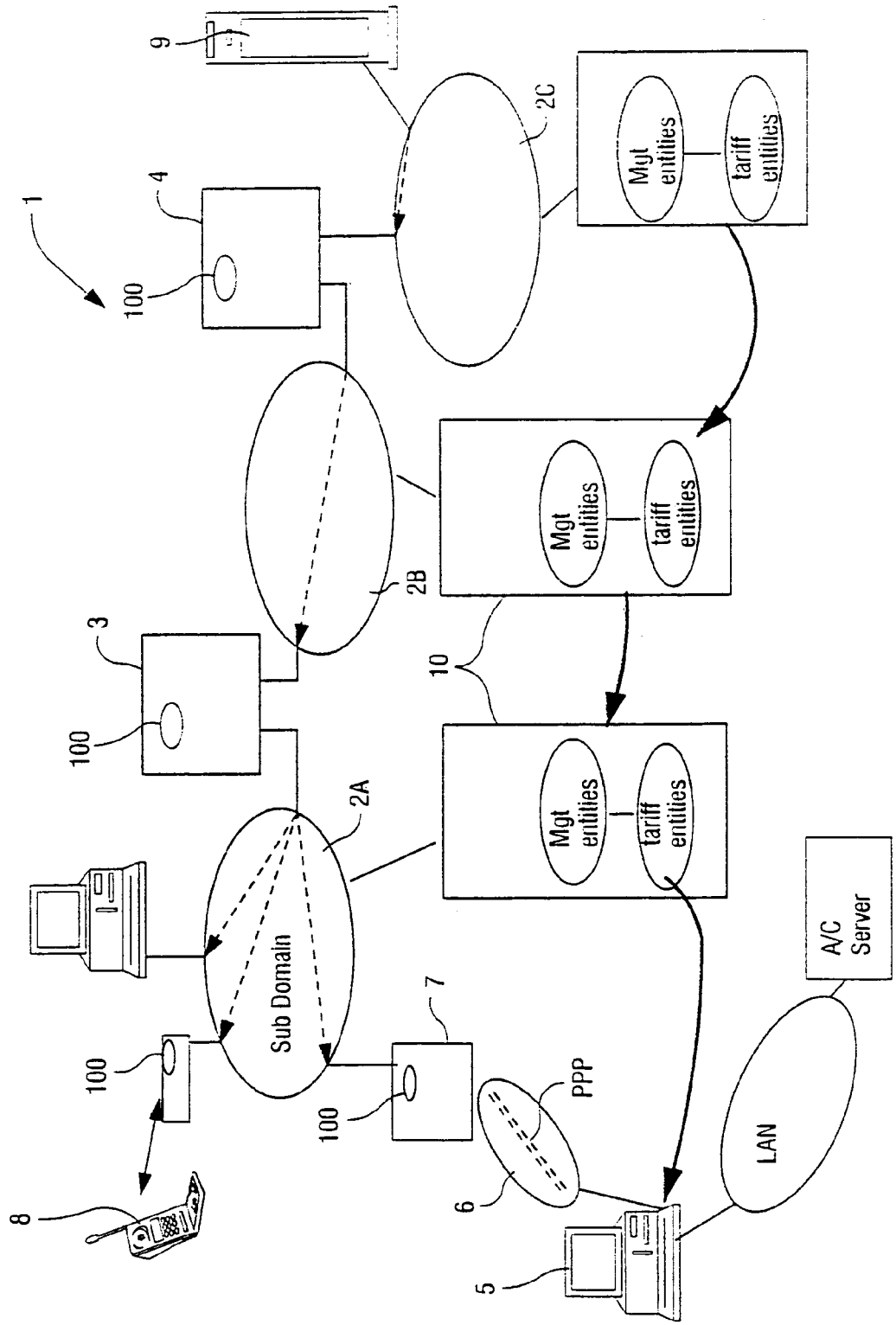
FIG. 1 is a schematic showing a network embodying the invention.

As shown in FIG. 1, a communications network 1 includes a number of network sub-domains 2A-C. The network sub-domains may be under the control of different operators who may not trust each other. The network subdomains are interconnected by gateway routers 3, 4. In the present example the communications network is the Internet and supports both unicast and multicast Internet Protocol (IP) and associated protocols. A customer terminal 5 is connected via a public switched telephony network (PSTN) 6 and an access router 7 to a subdomain 2A. A single blocking test is applied to traffic at this point of access. The gateway routers 3,4, and access router 7 may be commercially available devices such as CISCO series 7500 routers and CISCO series AS5800 universal access server respectively. Other customer terminals are connected to the network, including a Java-enabled mobile terminal 8 and a data server 9. The customer terminal 5 may be connected via a LAN to an accounting server. The accounting server may include an accounting object as described below that receives measurement data from the customer terminal.

In addition to the local tariff variation mechanism that is described below, the network also uses network-based control of a number of tariff bands. A network management platform 10 is connected to each subdomain. Each network management platform may comprise, for example, a computing system comprising a SPARC workstation running UNIX (Solaris) together with network management applications. The network management platform 10 hosts management entities and tariff entities. The network management platform communicates with agents 100 in managed devices connected to the respective subdomain, for example using SNMP (simple network management protocol). The management platforms monitors the overall loading of network resources in the respective subdomains, and, as will be further described below, adjust the tariffs for network use accordingly. The Net management platform (NMP) instructs the agent to monitor the device and report aggregated results at regular intervals back to the NMP, so the NMP can monitor the combination of all reports.

Tariff data is communicated to peer tariff entities in other subdomains and also to the customer terminals. The tariff data is multicast using, for example Distance Vector Multicast Routing Protocol (DVMRP) or Protocol Independent Multicast (PIM) dense mode. The tariff data channels are announced and monitored using protocols based on SDP (Session Description Protocol), SAP (Session Announcement Protocol) Charging is carried out on a "pay and display" model. Each customer terminal monitors its own network usage, for example by counting the number of packets it sends or receives across the network interface and the quantity of data (in bytes) in those packets. It calculates, using a tariff received via the network, the payment due to the network operator, and makes a corresponding payment into an account at the network operator. The network operator polices the use made by customers of the terminal by intermittently sampling traffic to or from a particular customer and comparing the use made and the use paid for.

The tariffs supplied to the customer terminals are divided into bands of different volatilities. The tariffs are varied under the control of the network operators to reflect the overall loading of the network. That is to say, if network loading becomes high, then the tariffs may be increased to reflect the scarcity of network resources.

A service provider may offer different products defined by different service level agreements, and/or by different price volatilities. For example product A might offer best-effort service at a fixed price while another product B might offer best-effort service at a variable price. A service provider may adjust product prices on the basis of the following parameters: the price the service provider pays to its wholesale provider: competitors' prices; current resource utilisation; relevant demand for different products. In response to changes in these parameters, tariff adjustments may be effected in one of three ways. Firstly, a tariff may adjust prices on the basis of local observations of network loading, without necessitating explicit communication from the provider. This approach, which is described in further detail below, needs to be built into the tariff at the outset, and is limited to those price variations which are dependent exclusively on local observations. Secondly, the provider may tune a tariff by adjusting some of its parameters. This kind of adjustment is required when the decision is dependent on parameters which cannot be observed directly by the customer, e.g., variation in the wholesale price of network resources. Thirdly, the provider may completely replace a tariff. This is required when the existing tariff cannot accommodate the changes that are required.

The first of the tariff changes described above is necessarily carried out automatically. The second type of change may be performed manually, or by an agent that issues adjustments automatically in response to observations made by the service provider system. The third type of change is likely to be performed manually, as replacement of a new tariff will in general require an element of design requiring human input. However, it is possible that an agent might be employed to automatically switch tariffs for a product on the basis of a set of specified rules. This section describes a prototype that we implemented to demonstrate the tariff subsystem outlined above. Features of the design include:

using mobile code to represent tariffs and associated user interface components;
  use of a repeated multicast announcement protocol to communicate tariffs and tariff adjustments efficiently;
  using dynamic class loading and reflection in order to receive and tune tariffs.

The prototype consists of a library of general-purpose Java classes and two specific applications, namely:

a provider system which allows the provider to introduce, replace, and tune tariffs for a number of products;
  a customer system that enables customer to keep track of the charges being applied for the products they are using.

The provider system services multiple instances of the customer system running on different hosts in a multicast-enabled network. A multicast announcement protocol is used to communicate tariff changes from the provider system to customer systems. In order to maximise flexibility with respect to the definition of tariffs, we chose to represent tariffs using Java classes. This technique is also used to supply user interface components to customers to support visualisation of the behaviour of a tariff.

The Tariff interface acts as the base class for all tariffs. This defines a single operation get GUI ( ) which returns as a Java SWING component that can be incorporated into the customer's GUI (graphical user interface). This GUI component enables the customer to visualise the behaviour of the tariff using techniques appropriate to the tariff.

Subclasses of the Tarrif interface establish a set of tariff types, each of which is associated with a different set of measurement and input parameters. These parameters are identified by listing them in the signature of the getcharge ( ) method. For example, the interface RSVPTariff defines getCharge ( ) as receiving n RSVP TSPEC, allowing for the definition of tariffs that compute price on the basis of the characteristics of an RSVP reservation. On the other hand, the interface PacketCountTariff defines getcharge ( ) as receiving measurements of packets in, packets out, and current congestion (typically measured as a function of packet drop), allowing for the definition of tariffs that are dependent on packet counts and sensitive to congestion. Other tariffs may be added as new forms of usage-measurement emerge.

Tariffs are defined by providing implementations of the various tariff interfaces described above. For example, the tariff PacketCountLinear implements PacketCountTariff to compute charges in proportion to packet counts. Another tariff CongestionSensitiveLinear works on a similar basis, but adds a penalty charge if the customer does not stay within a specified traffic limit in the presence of congestion.

In addition to the tariff interface implementation, a tariff may make use of other 'helper' classes to assist in its operation, as well as one or more user interface component classes for customer visualisation purposes. A provider-side user interface may also be required in order to enable the provider to make tariff adjustments.

A complete tariff description consists of a set of Java classes, some of which are destined for the customer system and others which are intended for use by the provider system. The customer-side classes are bundled into a Java archive (JAR) file to facilitate processing by the provider system.

In order to deploy a new tariff, the provider system first loads the tariff classes which it requires into its execution environment. It then loads the customer-side bundle, serialises it, signs it with a private key, and uses an announcement protocol to distribute it to customer systems. The use of a signature makes it possible for customers to verify that received tariffs are authentic.

Upon receiving the bundle, each customer system verifies the signature (using the public key matching the provider's private key), and at the activation time specified in the announcement protocol headers which may be significantly later, e.g. hours or days, unpacks the bundle, and loads the classes into its execution environment using a purpose-built dynamic class loader. An instance of the received tariff class is created and installed in place of the previous tariff. If the tariff has a user interface component (obtained by calling the tariff object's getGUI ( ) method), then it replaces the user interface of the previous tariff. The change in user interface serves to notify the user that the tariff has changed.

Tariff adjustment involves the remote invocation of an operation which is specific to the tariff currently in force. This means that a customer system cannot know the signature of this operation in advance of receiving the tariff i.e. the operation will not be listed in any of the tariff interfaces known to the customer system.

In order to get around this problem, use is made of the "reflection" feature supported by Java. In order to disseminate a tariff adjustment, the provider creates an instance of an Invocation object, which stores the name of the operation to be called, together with the parameters that are to be supplied to it. This object is then serialised, signed, and announced using the announcement protocol. When an adjustment is receive and verified by a customer system, the Invocation object is de-serialised and applied to the current tariff by using reflection to invoke the described operation.

In order to simplify the announcement protocol, adjustments are required to be idempotent and complete. Idempotency guarantees that a tariff will not be adversely affected if an adjustment is applied more than once. Completeness implies that an adjustment determines the entire parameter set of a tariff object, so that an adjustment completely removed the effects of any previously applied adjustments.

The customer system may apply a tariff by repeatedly invoking the getcharge ( ) operation supported by that tariff every second, and adding the returned value to the cumulative charge. The parameters supplied to getcharge ( ) depend on the kind of tariff currently in force. For example, if the tariff is an implementation of PacketCountTariff, then measurements of inbound packets, outbound packets and congestion over the past second are required. However, if the tariff is an implementation of RsvpTariff, then only a TSPEC describing the current reservation is required. This implies that a customer system can only subscribe to a product if it can supply the parameters require by the tariff associated with hat product.

Each invocation of the getcharge ( ) method also results in an update to the tariff-specific user interface. For example, in the CongestionSensitiveLinear tariff, the usage parameters supplied to getcharge ( ) are used to update the graphical displays of traffic and congestion.

The announcement protocol is used to communicate serialised tariffs and adjustments from a provider system to multiple customer systems. The number of customer systems is assumed to be large, and a repeated multicast solution is adopted.

Each product supported by a provider is assigned a multicast channel for announcement purposes. Customer systems listen to the channels corresponding to the products that they are using. In the current implementation, it is assumed that each customer system has knowledge of well-known multicast addresses for the products it is interested in.

For each product channel, the provider repeatedly announces the current tariff and the most recent adjustment made to it (if any). Each announcement carries a version number, which is incremented each time the announcement is changed. Customer systems only process announcements when a version number change is detected. If a new customer joins a channel, it waits until it receives a tariff before processing any adjustment announcements. Furthermore, an adjustment is only applied if its announcement version is greater than that of the current tariff, thereby ensuring that a missed tariff announcement does not result in the application of a subsequent adjustment to an old tariff.

While centralised monitoring and control of tariffs by the network management platform is effective to respond to global changes in the loading of the network, it is difficult to handle localised congestion in this way. It is difficult to cause a price rise signal to be multicast in such a way that the signal is only received by those attempting to communicate packets through the point of congestion. This would require a separate multicast transmission for each element in the Internet, e.g. a multicast for every different queue on every interface of every router. Alternatively some aggregation of price rises triggered by local resource loading might be used. This however would mean that price rise signals were sent to users who were not making use of the congested resource. This in turn would make it necessary for the price rise signal to be damped, reducing the ability of the price rise to reduce the demand on the congested resource.

To overcome these difficulties, the tariff algorithms installed on the customer terminals are arranged to respond automatically to congestion in a network resource being used by the terminal. Each algorithm includes a function which varies the price for network usage in dependence upon the detected congestion level. This function may be integrated in the main tariff algorithm, or, as in the example described here may be a separate algorithm used to calculate a premium to be added to a price calculated in accordance with the main tariff algorithm.

The main tariff algorithm calculates a price P as a function of a number of quality parameters, $Q_1$, $Q_2$, $Q_3$ where, for example, $Q_1$ is a specified latency for packets communicated across the interface between the customer terminal and the network, $Q_2$ is the reserved bandwidth for the transmission, $Q_3$ is a specified level of reliability corresponding to a maximum permissible level of packet loss.

The price P is then given by:

$$P = f(Q_1, Q_2, Q_3 \ldots )$$

Figure 2B:
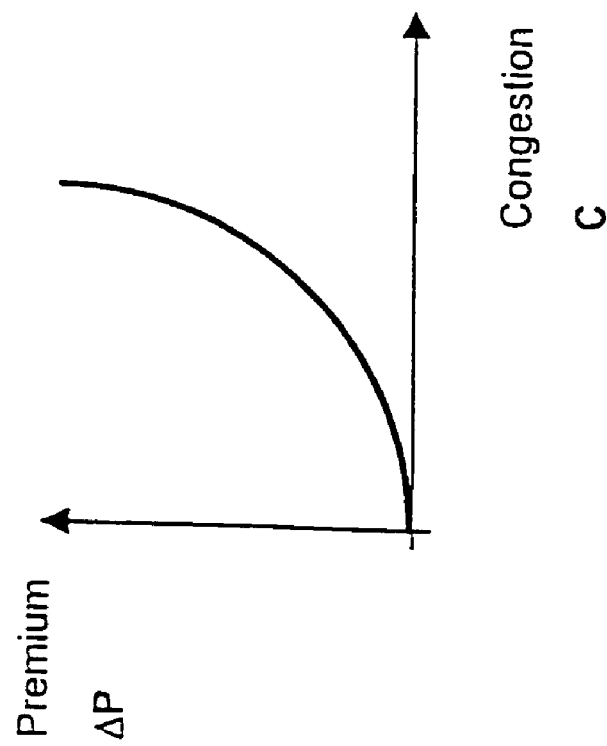
FIGS. 2a and 2b are graphs showing tariff functions.
Figure 2A:
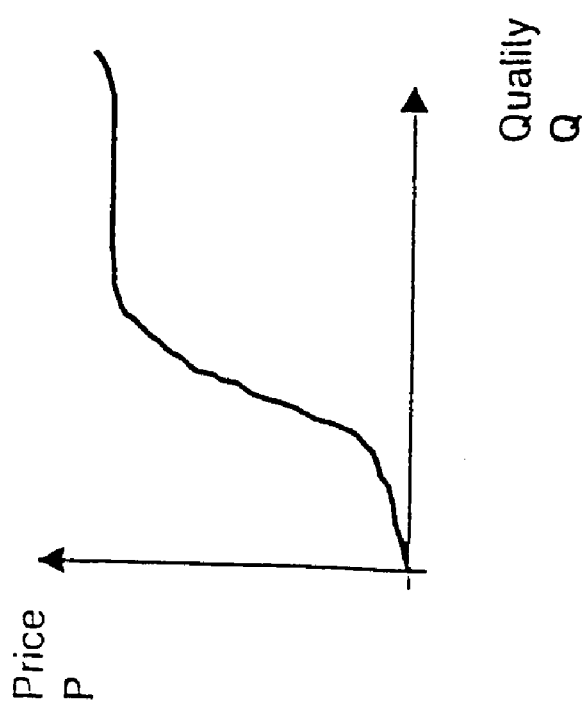

An example of the pricing function in terms of one of the quality parameters Q is shown schematically in FIG. 2a.

The congestion tariff algorithm calculates a premium $\Delta P$ which is a function of one or more congestion parameters C:

$$\Delta P = f(C_1, C_2 \ldots )$$

The congestion parameters provide a measure of the loading of the resources which a customer terminal is making use of at any given time. In the present example the ratio of packets lost to packets received is used as the congestion parameter. This parameter is readily calculated, for example in the case of packets using TCP (transport control protocol), or RTP (real time protocol) over UDP (user datagram protocol), since such packets include a sequence number. FIG. 2b shows one example of the function for generating the premium. In this case, the premium increases as an approximately exponential function of the congestion, so that at low congestion levels a small premium is charged, while if congestion increases still further, then at higher levels of congestion the premium increases sharply.

In an alternative implementation, an explicit congestion signal is added by any congested router within the network to packets transmitted to the customer terminal. Whether congestion is signalled explicitly or implicitly by packet drop, the price algorithm might not directly charge for congestion indication. Instead, it may charge if the customer terminal does not halve the congestion window in response to a congestion indication. Halving the congestion window halves the rate of transmission which is the standard response to congestion indication used in TCP and other compatible congestion control protocols. The change in transmission rate can be measured by the network provider as well as at the customer terminal, although this places a heavy load on router processing resources. If the provider is merely sampling certain customers to audit their own measurements, this results in an acceptable load.

Although only a single main tariff and premium are described here, in practice different subdomains, and different service providers associated with each subdomain, may each have a different pricing structure, with different main and premium tariffs. However, there is across all the subdomains a common relationship between network loading levels and congestion signalling.

The operation of this second implementation will now be described in the context of a network operating using a differentiated service as described in the Internet Engineering Task Force draft "Differentiated Services Operational Model and Definitions" and in the paper by David D Clark (MIT), "A Model for Cost Allocation and Pricing in the Internet", presented at MIT Workshop on Internet Economics, March 1995, URL:http://www.press.umich.edu/jep/works/Clark-Model.html. In a network implementing differentiated services, nodes are arranged to discriminate between packets to provide different levels of service. This capability might be used, for example, to accord delay-sensitive data, such as data generated by an IP telephony client, a higher priority compared to other data, such as email data. At the network edge, for example at a client terminal running the IP telephony client, bits in a TOS (type of service) octet contained within each packet header are set to indicate the appropriate service level. Those bits are used by routers within the network to determine how the relevant packets should be handled.

Figure 3:
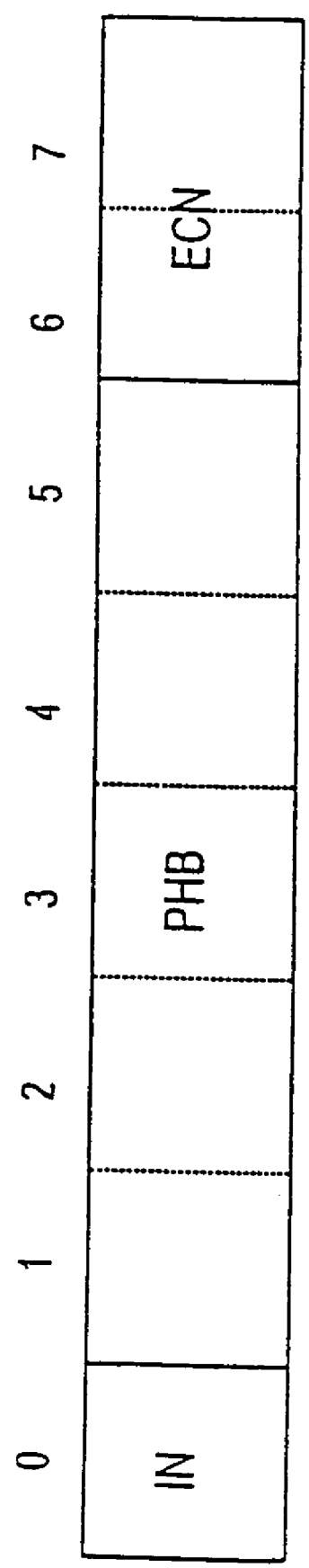
FIG. 3 shows the format of a differential service byte.

The TOS octet when used in this way is termed the DS (differential service) byte. The format of the differential service byte is shown in FIG. 3. Bit zero, labelled "IN" indicates whether the packet is inside or outside a defined profile. Bits 1 to 5 labelled "PHB" define a "per-hop-behaviour" that is they indicate how, for example, a router should handle the packet, e.g. by according it lower or higher priority. Bits 6 to 7, in this particular form of the DS byte, are used for explicit congestion notification (ECN). One of these bits is set to indicate whether the routers in the path of the packet are capable of setting the ECN field, and the other bit is used as a flag which is set (by ECN capable routers) when congestion, or loading which would potentially lead to congestion, occurs. Random Early Detection (RED) algorithms are currently implemented in routers. These algorithms measure average queue length within the packet buffers of a router. An exponential moving average is calculated. When that average queue length exceeds a predetermined threshold, then the router signals that congestion is occurring. Conventionally this signalling has been done simply by dropping a packet. However, in the context of an ECN scheme, the router, instead of dropping a packet, sets an ECN bit in a packet header to indicate that congestion is occurring. This is done probabilistically: that is, some only of the packets passing through the router are marked. The probability of a packet being marked increases with the average queue size. In the rare case that the queue increases to a length where the router buffers are full, then packets are dropped, rather than an ECN bit being set. In this case ECN bits are set for all the remaining packets.

In operation, if the client terminal 5 is accessing a data source on the server 9, congestion may occur, for example, at router 4 which links network sub-domains 2B and 2C. RED-like algorithms in the router 4 detect that the queue lengths in the router buffers, as calculated using the exponential moving average, exceed a predetermined threshold. Accordingly some of the packets from the server 9 en route to the client terminal have the ECN bit of the DS byte set by the router 9 to mark the fact that congestion is occurring. At the client terminal, the DS byte in the headers of incoming packets is read. A moving average of the number of packets containing an ECN bit which is marked is calculated. This average then provides the congestion parameter $C_1$ which is used to calculate the premium:

$$\Delta P = f(C).$$

The total price to the user $P_{TOT}$ is then calculated by adding together the prices determined by main tariff algorithm and by the premium algorithm:

$$P_{TOT} = P + \Delta P.$$

This total price is passed to a cost decision agent running on the client terminal. This cost decision agent is programmed with user defined rules. These might state, for example, that the cost decision agent should authorise the system to proceed with a connection as long as the total cost averaged over a certain time period falls below a predetermined threshold, e.g. of £0.01 per minute, and that the cost decision agent should suspend a connection and alert the user if the cost rises above that threshold. Alternatively, as previously noted, the cost decision agent may handle several applications simultaneously, and may be programmed to slow down one of the applications as the premium for using a data source accessed by that application increases.

For some customers in some circumstances, the variability of the tariff for network usage may pose problems. For example, a customer might wish to schedule a multicast audio-video conference with, say, twenty participants and with the customer intending to pay the network usage costs for all of the participants. The conference will be scheduled a day or more in advance, but since the tariff is variable over time, at the point when the conference is scheduled, the customer will not know the cost which will be incurred. The preferred implementation of the present invention overcomes this problem for the customer, and also provides an additional revenue source for the network operator. This is achieved by applying a further tariff which defines a premium for price stability for a given customer terminal, the value of the premium increasing as the required duration of the period of stability increases. In the example referred to above, the customer scheduling a conference one day in advance refers to the current tariff to determine the present cost of the network resources required, including any congestion premium currently applicable, and then refers to the further tariff to determine the premium for maintaining the cost at its present value for a period of one day. Then if the user decides to make use of the fixed tariff a message is sent from the user to the network operator. The message identifies the data flows in question, for example by specifying the IP addresses and the service levels for the audio and video data flows between the participants, together with the current time at which the user is contracting for a fixed period, and the required duration of the fixed period and also an identifying code for the message. Alternatively, the message with these details may be tracked with an appropriate cryptographic function (e.g. MD5), and the hash value only communicated initially to the provider, and subsequently used to verify account data. Subsequently, for the duration of the specified period, in this case one day, the user applies the fixed tariff. In systems where the users themselves are responsible for generating accounting data and calculating the applicable charge for network usage, then the user calculates the charge using the fixed tariff and returns the accounting data to the network operator together with the identifying code for the fixed tariff contract.

This aspect of the invention is not only applicable to systems where tariff variation is carried out locally in response to the detection of congestion, but may also be used in systems where, for example, the only variation is imposed by the network operator.

The tariff for the stability premium may be distributed by multicasting from tariff entities in network operator platforms to the customer terminals in the same manner as described previously for the other tariffs discussed above. As with those other tariffs, different tariffs and optionally different periods of stability might apply to different service levels. In a scenario such as that discussed in the preceding paragraph, then different service levels might be used for different elements of the audio and video data streams required for the multicast conference.

Figure 2C:
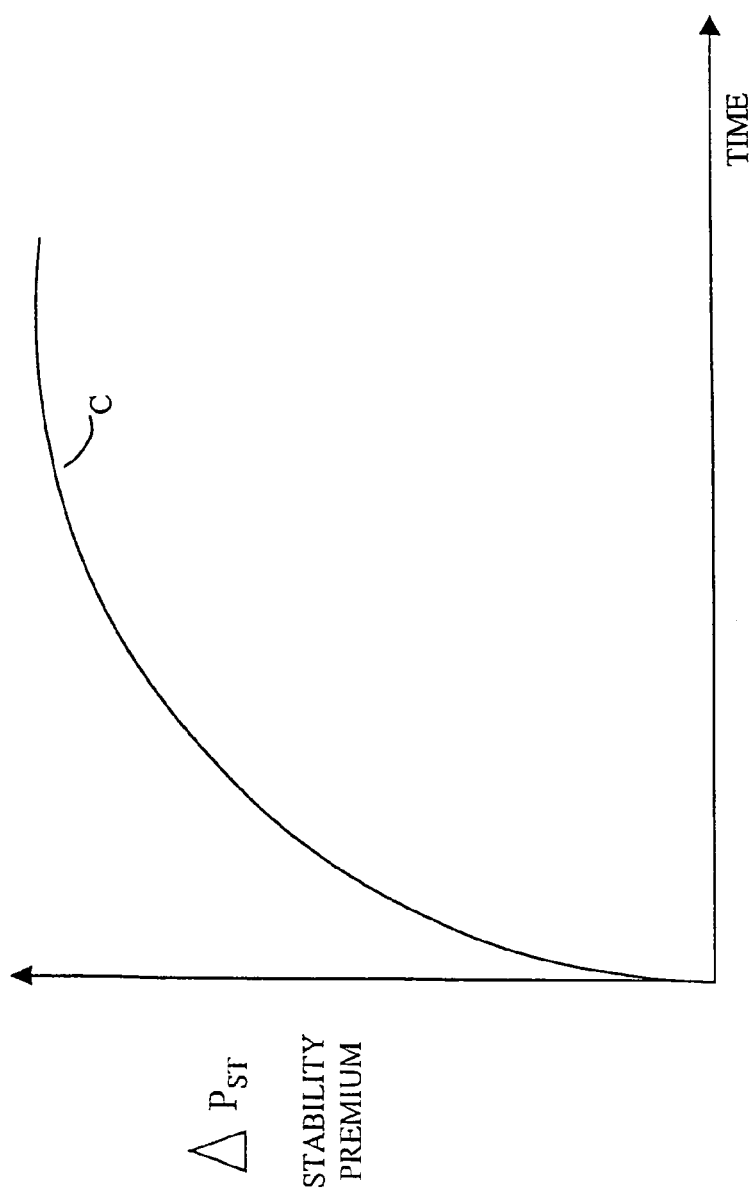
FIG. 2c is a graph showing a stability premium tariff.

FIG. 2c shows a possibility for the stability premium tariff. This tariff may be embodied in a Java function multicast to the users. Curve C is communicated to the customer terminal as another subsidiary algorithm that contributes to the main tariff algorithm. The customer may choose a period of price stability and calculate the premium above the spot price that will require using curve C. Once the period of stability expires a new one can be bought at the premium over the spot price at that time. To buy a period of price stability, the customer must announce the period required and the range of addresses for which is applies to her provider. It may be required for one address (e.g. for the duration of an Internet phone call to a single person) or for a range of addresses (e.g. for a video conference). Certain risk-averse customers might request stable pricing for all addresses all the time.

For ease of description, the preceding sections have treated in isolation the local variations in tariff in response to congestion. In practice, this mechanism will in general be combined with other responses to congestion, and with other sources of variation in the tariff. Also, a decision to proceed with a transmission despite congestion will in general require the consent of parties at both ends of the transmission. Considering the entire system of the data source, network and routers and the data receiver, the implementation of an increase in tariff (also termed here a "fine") in response to locally detected congestion occurs as a last resort. Other responses are implemented first, in the following numerical order:

1. the network re-routes around congestion
2. the network borrows capacity from lower levels of service (lower in the context of the relevant dimension(s) of QoS) including the best effort service 3. the network introduces extra capacity (possibly automatically)
4. the end-system establishes that the congestion is on the shared network and not just on the access links or end systems
5. the end-system sets QoS requirements to a "higher" level (if cheaper than the fine for ignoring congestion at the current level)
6. the end-system decides it is essential to ignore the congestion, given the fine for doing so might be quite high
7. both (all) end-systems agree to ignore the congestion.

Typically, it is at step 4 that an ECN signal is generated. Steps 1 to 3 precede the generation of this signal and steps 5 to 7 follow the generation of the ECN signal.

Figure 4A:
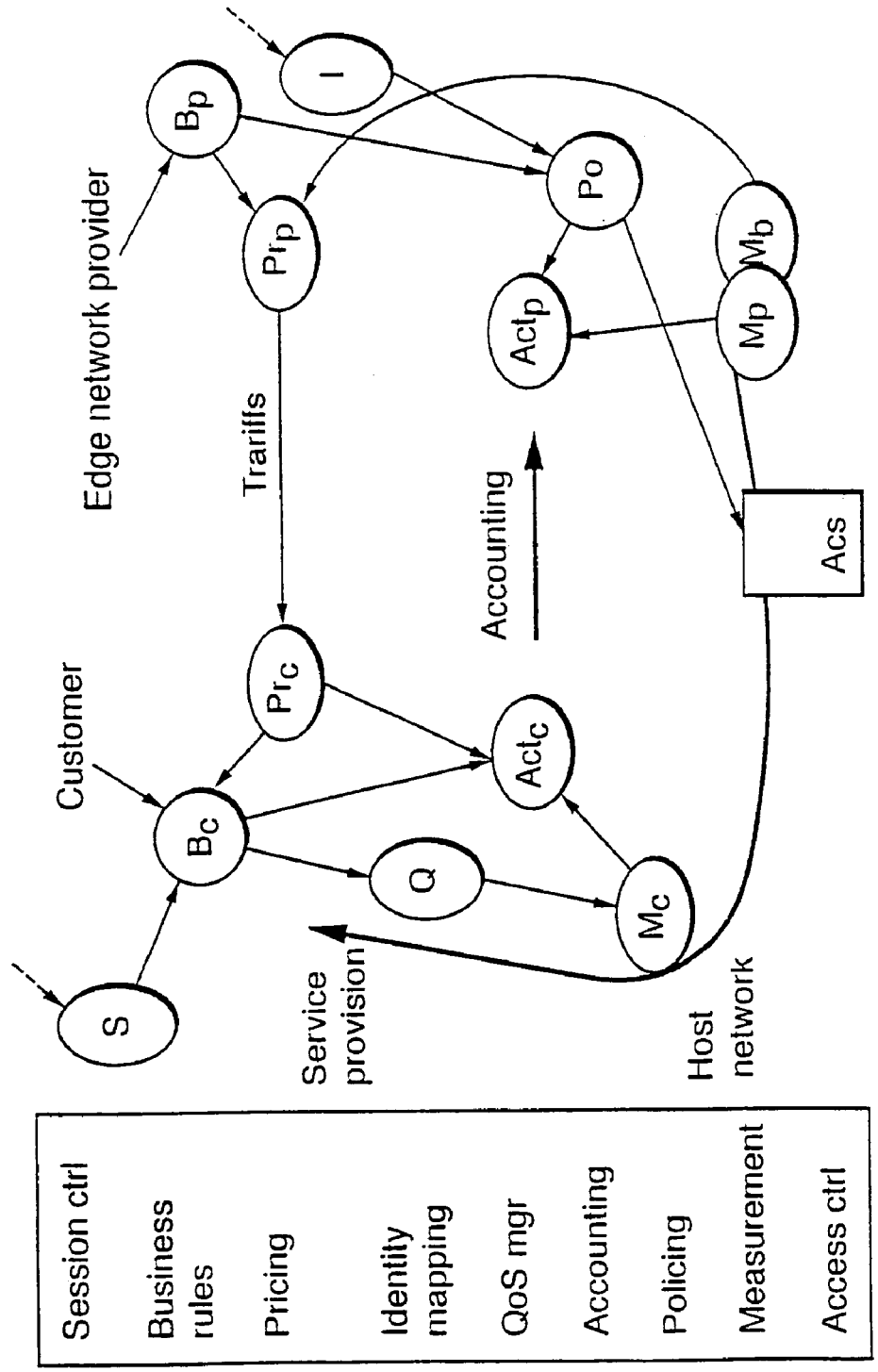
FIGS. 4a-4b are schematics showing the component objects of a charging architecture for use with the network of FIG. 1.
Figure 4B:
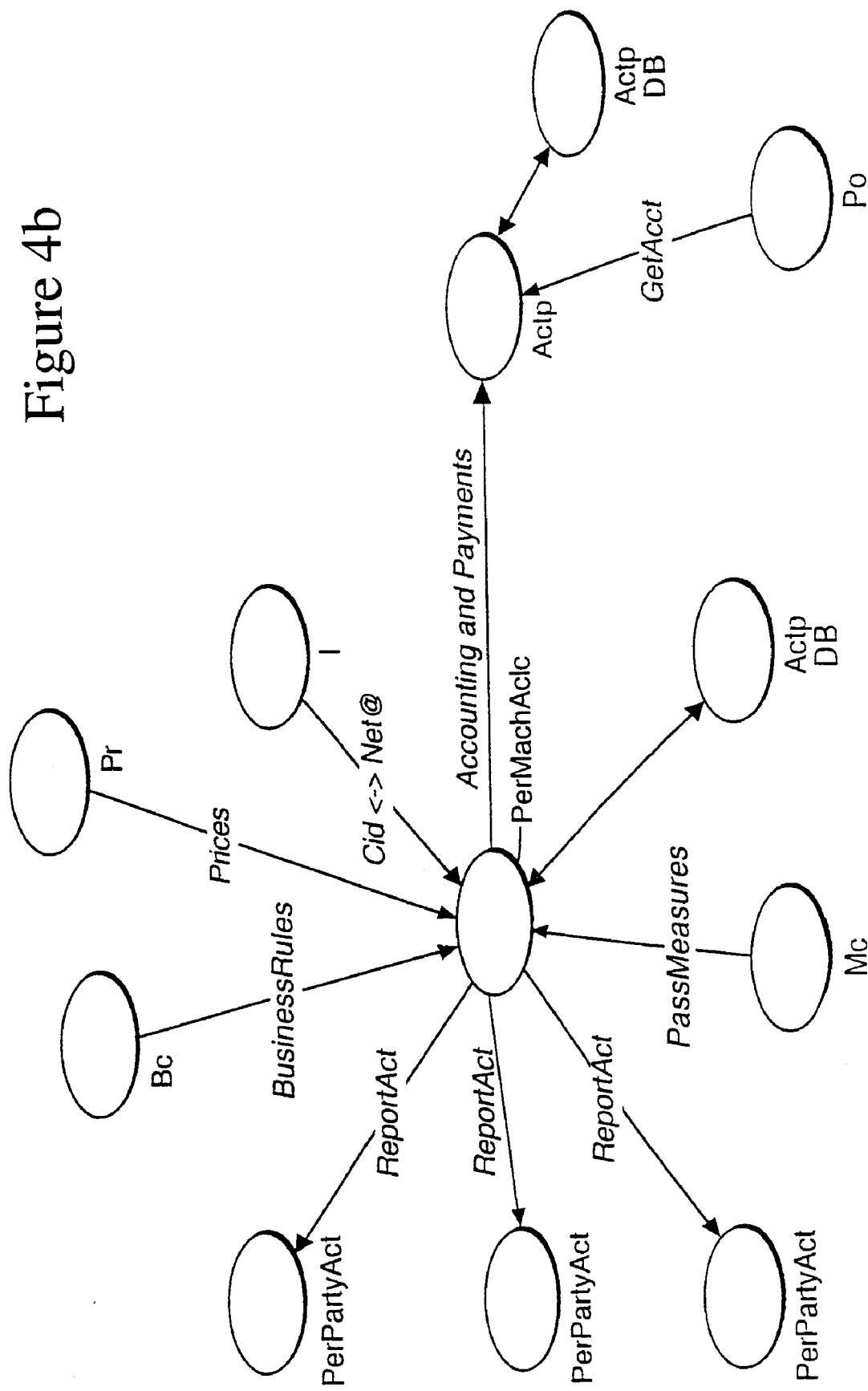

The last step prior to proceeding with a connection and paying the premium for doing so is establishing agreement by both parties. Accordingly, when the customer terminal detects congestion, either through receiving explicit congestion notification, or through detection of a relevant parameter such as packet loss, the customer terminal signals this fact back to the or each other end system. In the present example therefore, the client terminal 5 signals to the data server 9 that congestion is occurring. The data server is programmed with rules, which as at the customer may be implemented as an agent, which determine the response to such a signal. For example, the server may refuse service in these conditions. As described previously with respect to FIG. 1, in the present example tariffs are multicast through the network from network operators to the customer terminals, and charging is carried out using a "pay and display" process. FIGS. 4a and 4b shows the objects used to implement the charging architecture in this case. FIG. 4a shows the higher level objects and 4b shows the component objects used in a software implementation of the architecture of FIG. 4b. In FIG. 4a, objects on the client terminal are shown in the half of the Figure labelled "customer" and objects on the access router 7 and the corresponding network sub-domain are shown in the half of the Figure labelled "edge network". The objects on the customer terminal include a session control object S, a customer business rules object $B_c$, a customer pricing object $Pr_c$, a QoS manager Q, a customer accounting object Act, and a customer measurement object $M_c$. The business rules object $B_c$ receives information on those aspects of the session which involve liability for payment and receives current pricing data from the pricing object $Pr_c$. The customer business object makes decisions, under the customer's policy control on which chargeable services are utilised, and how much of the chargeable services are utilised. These decisions are fed to the QoS manager Q, which decides which mechanisms are used to achieve the requirements. The QoS manager then controls the customer measurement object $M_c$ to determine which aspects of traffic and service to measure and which aspects to ignore. The measurement object then records the selected aspects of the traffic, for example counting the number of packets received by the customer terminal and the QoS levels for those packets. These data together with the current tariffs, including any premium for congestion, are then used by the customer terminal to determine the charge payable to the network operator. The measurement object $M_c$ is also programmed with instructions which determine the frequency with which it passes data to the customer accounting object $Act_c$. The customer accounting object $Act_c$ passes payments to an accounting object $Act_p$ in the network provider's domain.

The accounting objects on the customer terminal may be implemented using a small encrypted flat-file database. On the network provider's side, the equivalent objects may be implemented using a larger database that is scaleable to handle e.g., tens of thousands of customer accounts. An object request broker (ORB) is used for communication between the customer-side objects and the network-side objects, implemented using commercially available tools such as ORBIX (TradeMark) from Iona Technologies plc.

On the network provider's side, that is to say within the subdomain to which the customer terminal is connected, the customer's traffic is measured by a version of M, denoted $M_p$, but only on a sampling basis determined by the policing function, Po. That is to say, the network operator samples the customer's traffic only intermittently. Po controls where in the network measurements are made in order to capture all of any particular customer's traffic. A bulk measurement function, $M_b$, is responsible for reporting aggregate traffic levels, as reflected in the moving average of the router queue lengths, to the pricing object, $Pr_p$. Bulk measurements would typically be collected from across the provider's domain to a centralised pricing function (which would be replicated for reliability). $Pr_p$ sets prices taking into account the business rules from the network provider's business object, $B_p$, as well as the current traffic levels reported by Mb and pricing from neighbouring providers (see below). The policing function, Po, compares sample measurements from MP with accounting messages received at $Act_p$ as a result of the customers own measurements. If it establishes that the accounts are insufficient it might restrict service at the access control gateway, Acs, or initiate some other punishment. Encapsulated within the accounting object another policing object checks the accounts match the payments within the contracted time for payment. Finally, the identity mapping function, I, provides a mapping between a customer's identity (account, digital signature, etc.) and their current network address (typically allocated by the ISP, whether unicast or multicast).

Figure 5A:
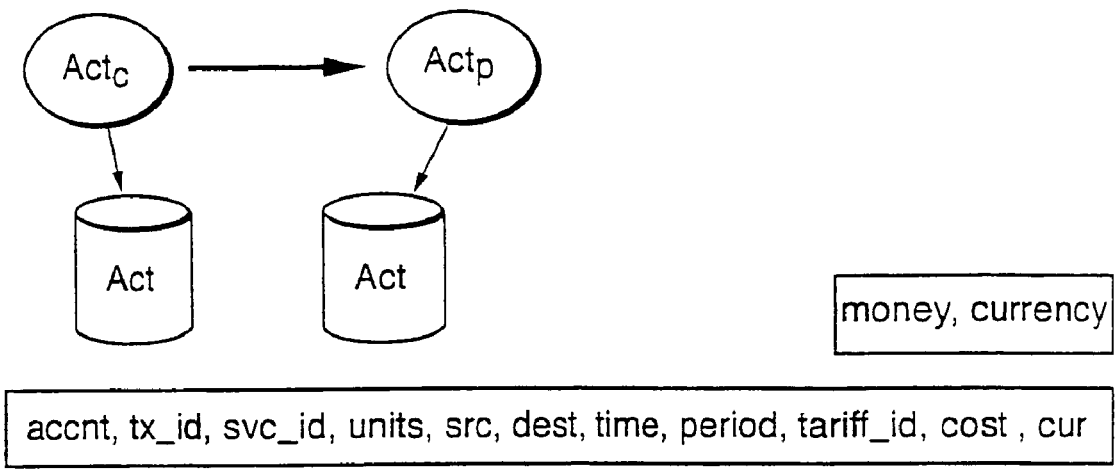
FIGS. 5a-5b show data passed between the accounting objects of FIG. 4.
Figure 5A:
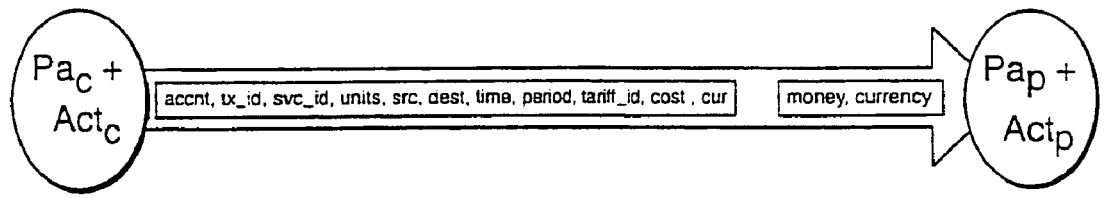
Figure 5B:
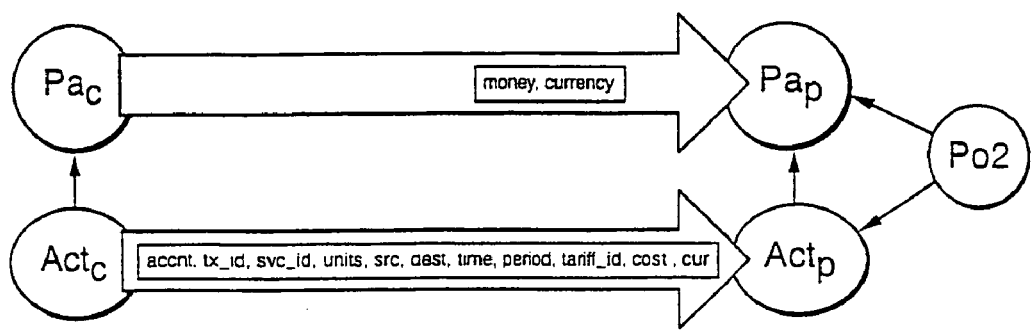

FIGS. 5a-5b shows the data which are passed between the accounting objects. In this example the account data comprises: account identity; bill record identity; service type identifier; source address; destination address; tariff identity; time; period (i.e. the period covered by the bill record); units; costs; and currency. In addition, the payment data comprises the amount of money and the currency of payment.

Figure 6:
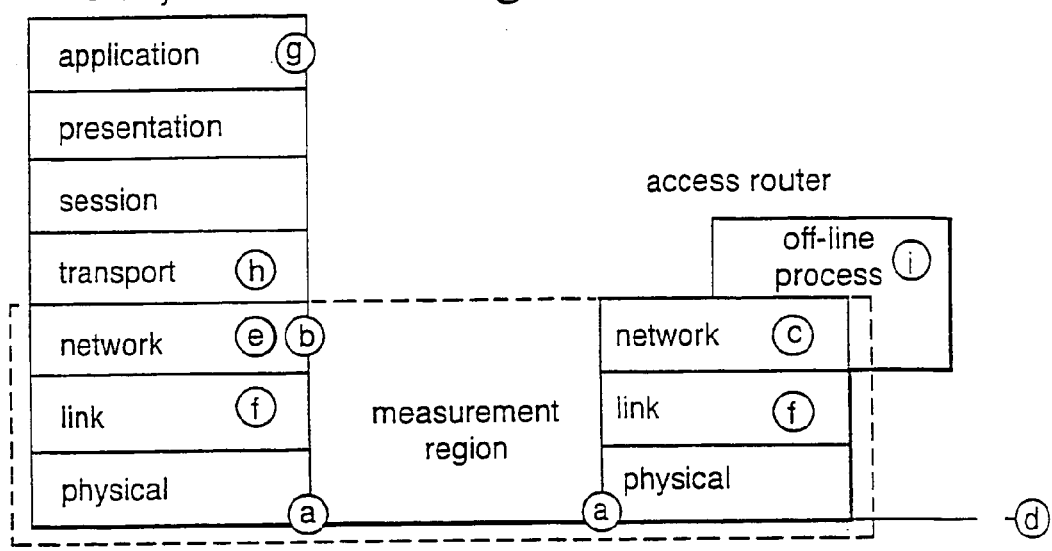
FIG. 6 is a schematic showing protocol stacks on a customer terminal and in the network domain.

FIG. 6 shows the measurement region within protocol stacks on the customer terminal and in the network domain. Ideally there would be two measurement points within this region, one trusted by the customer and one trusted by the network, for example at the two points referenced (a) in the Figure. For ease of implementation, a single measurement point (b) trusted by both parties may be used. This might be implemented, for example within a secure module such as a cryptographic card on the client terminal. As an alternative, measurements may be made at different points with some possibility of discrepancies between measurements. On the network the practical measurement point is at the first access device(s) that, for each customer, inspects network layer headers (c)(IP in this case). ISPs should not measure any deeper into their network (d) because their access network and systems will introduce delays and losses.

For an individual customer (e.g. on dial-up access), a practical point at which to measure would also be alongside the network layer but in their end-system's stack (e). Ideally these measurement points would be lower in each stack to be closer to the interface between the two parties and less likely to be affected by contention in the stack. However, measuring at the link layer (f-f) would be inappropriate because only some chargeable parameters set at the network layer will ever be reflected in link layer frames; network level multicast, end-end latency requirements etc. may never be visible at the link layer. Also, link layer headers would need to be ignored when measuring packet sizes for bandwidth calculations to avoid apparent discrepancies where different link technologies are chained together.

In the reception direction (up the stack) this choice of measurement points implies that the lower layers must be dimensioned (buffer sizes, interrupt and thread scheduling priorities) to cope with the most stringent QoS requirements of higher layers. As frames are taken off the physical media, the machine must be able to pass data up the stack without any chance that usage-charged data gets discarded (e.g. due to buffer overflow caused by interrupt contention) before it gets to the network layer. It is at the network layer where the ISP's service is to be measured and where it is most convenient for QoS requirements to control correct differential treatment of the various flows as they are passed further up the stack (on end-systems) or forwarded (on routers).

The measurement objects described above may be implemented using, with appropriate modifications, publicly available network metering software such as Nevil Brownlee's NeTraMet system. This is a software meter which conforms to the IETF internet accounting architecture described in RFC 2063 and RFC 2064. The meter builds up, using "packet sniffing", packet and byte counts for traffic flows, which are defined by their end-point addresses. Although generally, Addresses can be ethernet addresses, protocol addresses (IP, DECnet, EtherTalk, IPX or CLNS) or 'transport' addresses (IP port numbers, etc), or any combination of these, in the present implementation IP addresses only are used. The traffic flows to be observed are specified by a set of rules, which are downloaded to NeTraMet by a 'manager' program. Traffic flow data is collected via SNMP (Simple Network Management Protocol) from a 'collector' program.

Figure 7:
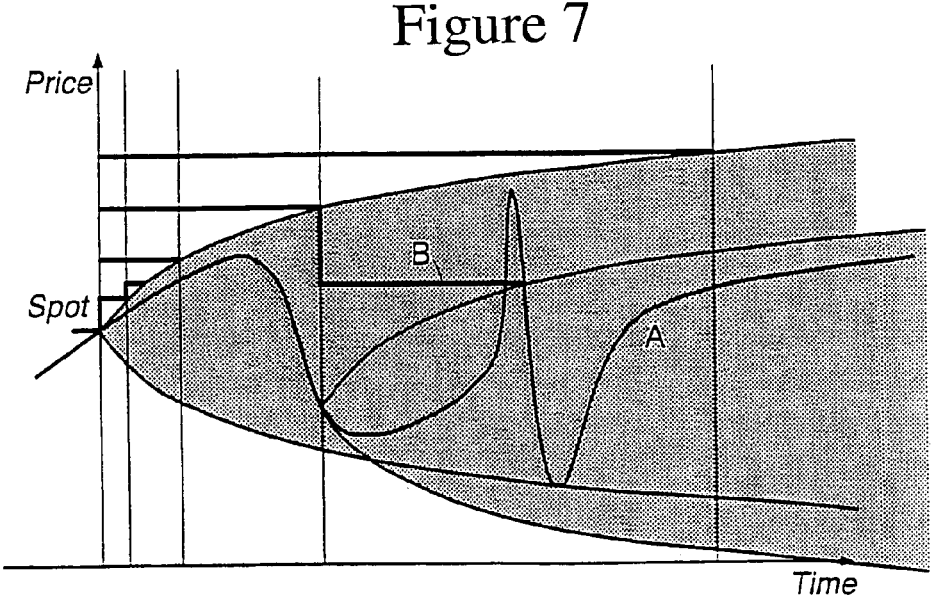
FIG. 7 is a graph showing the variation of tariff with time.
Figure 8A:
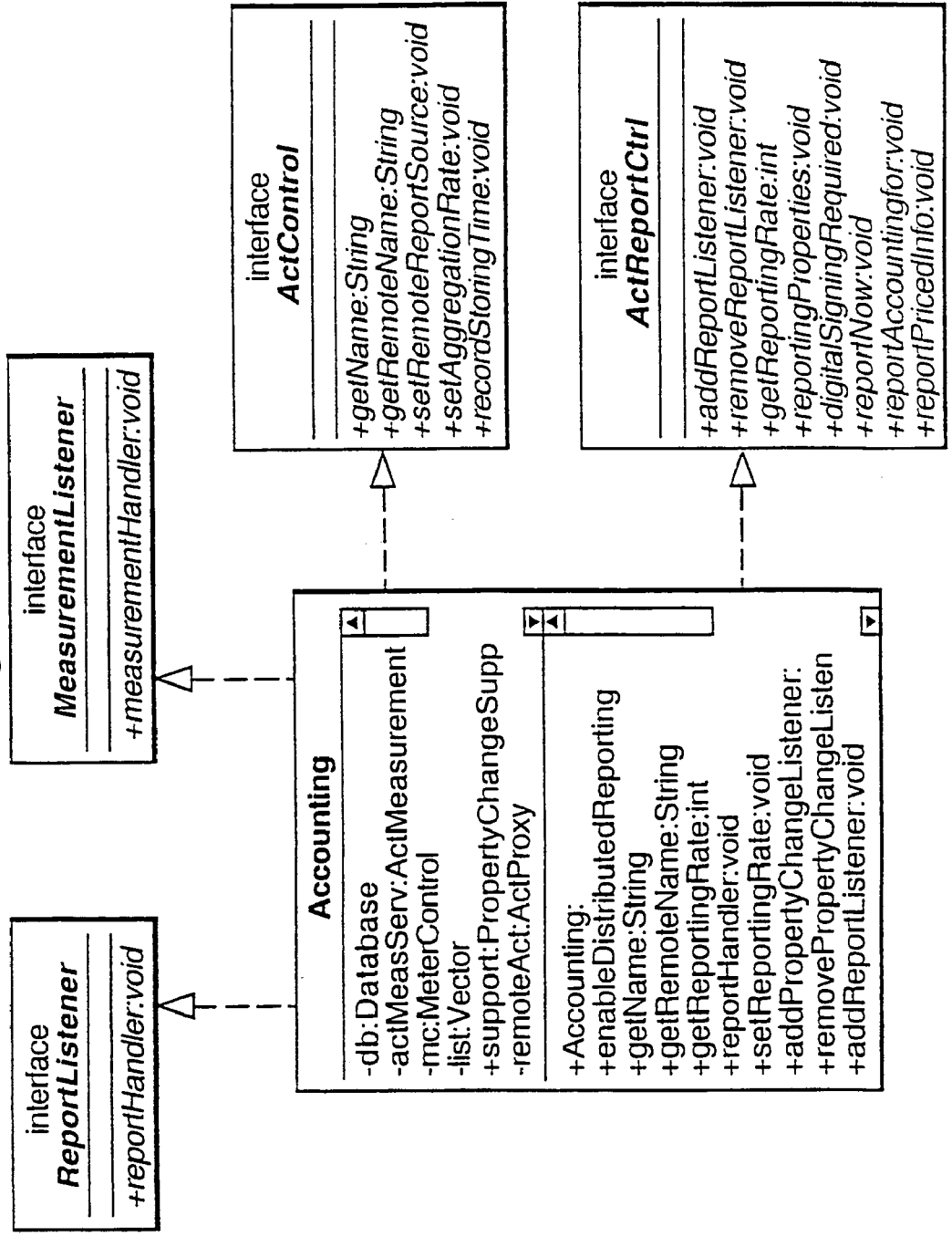
FIGS. 8a to 8e are class diagrams for software implementing accounting and measurement objects.
Figure 8B:
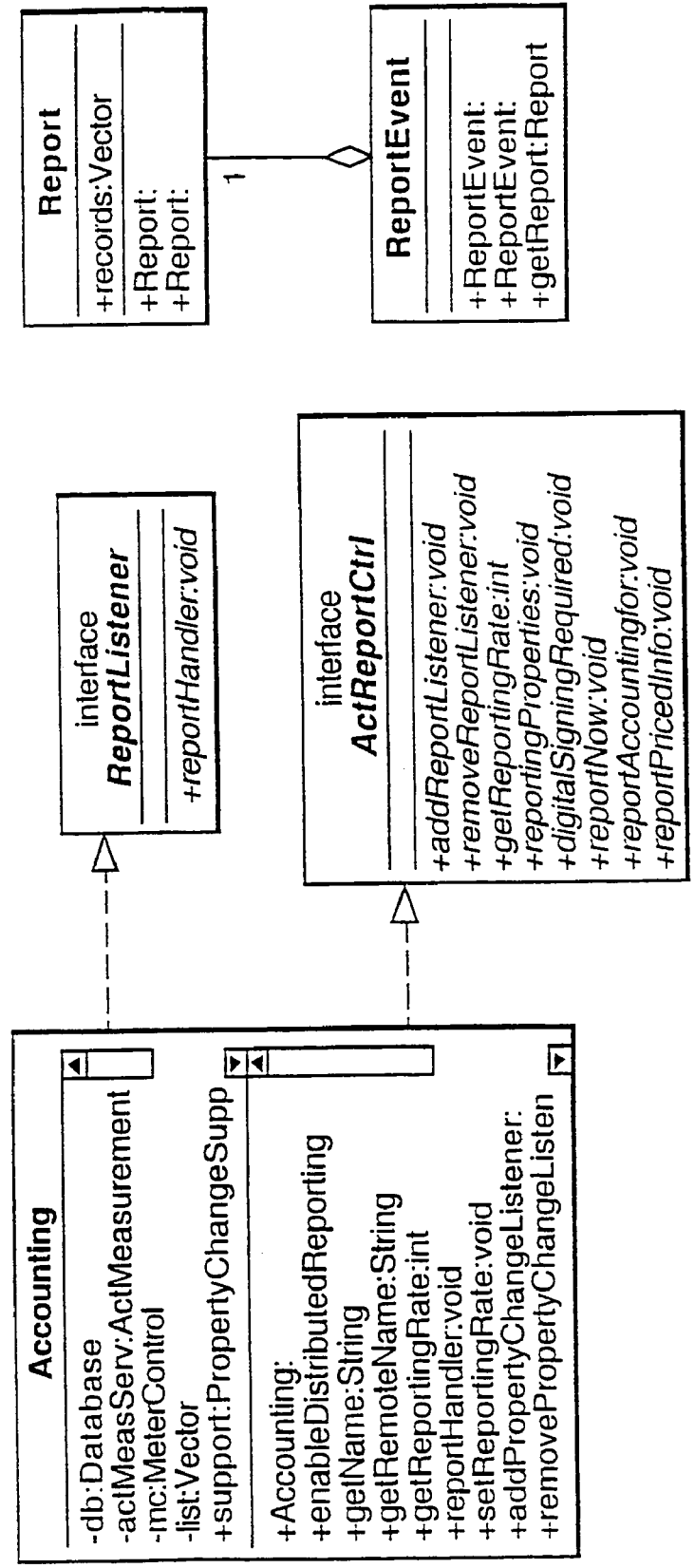
Figure 8C:
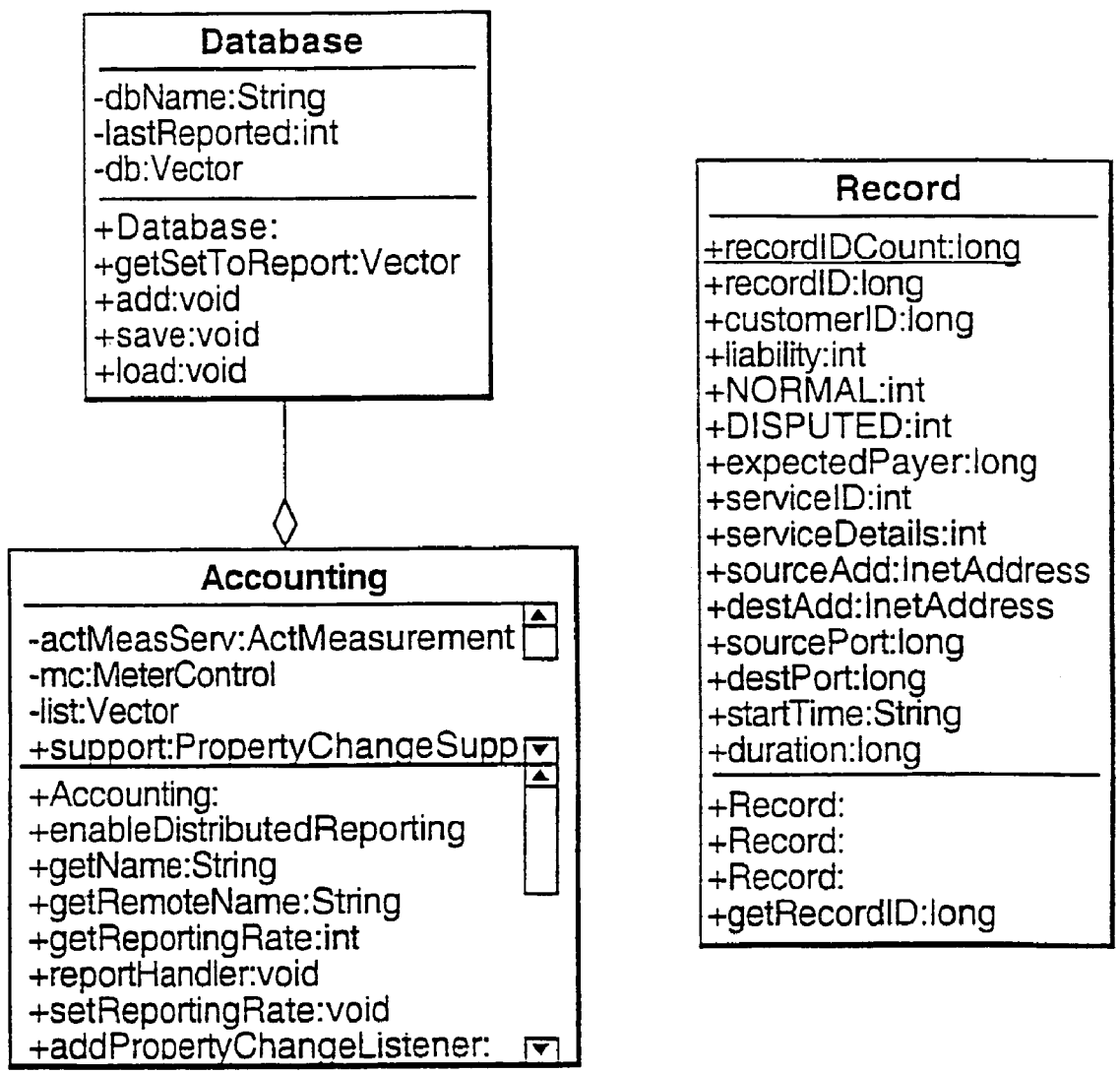
Figure 8D:
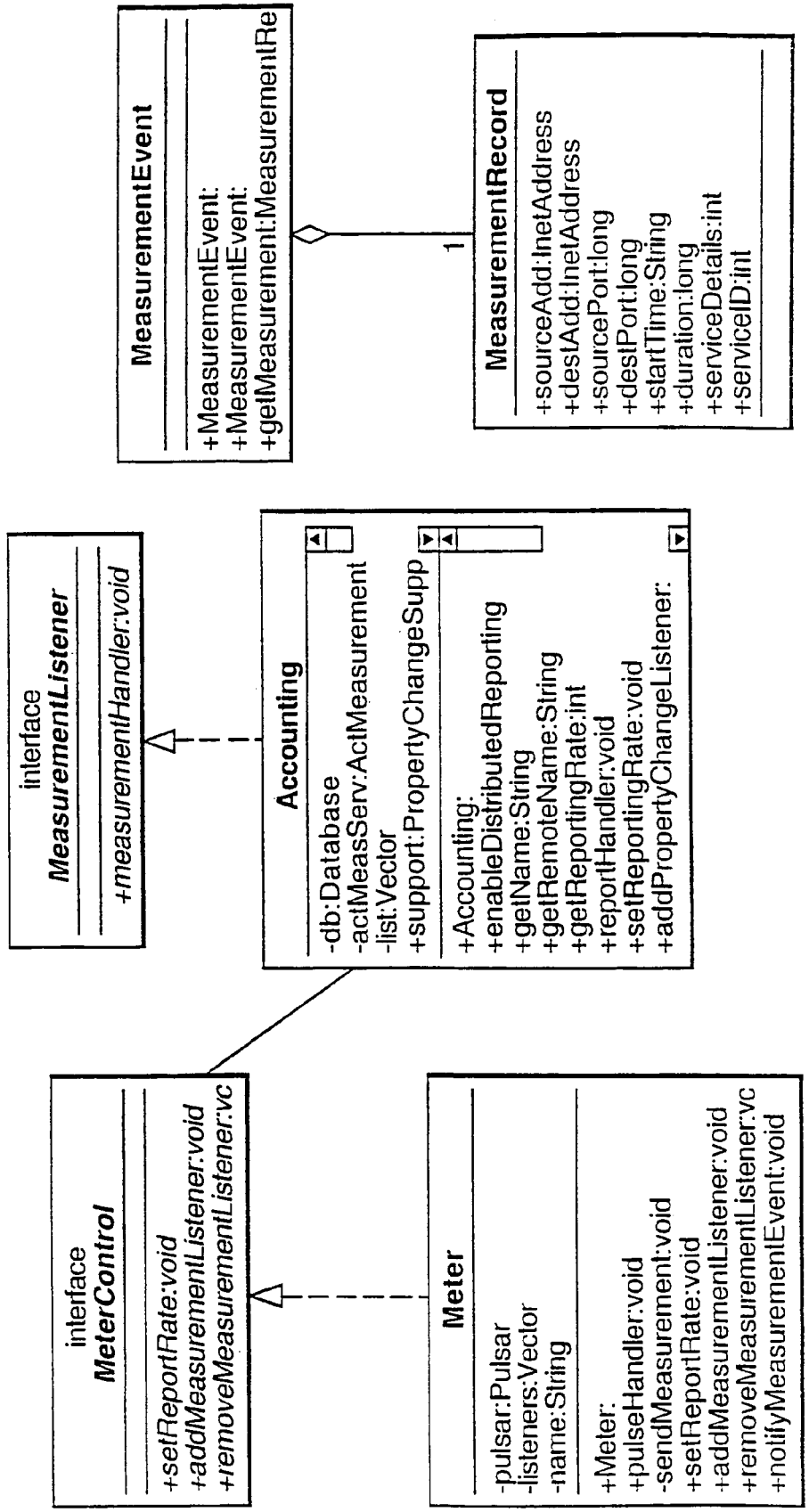
Figure 8E:
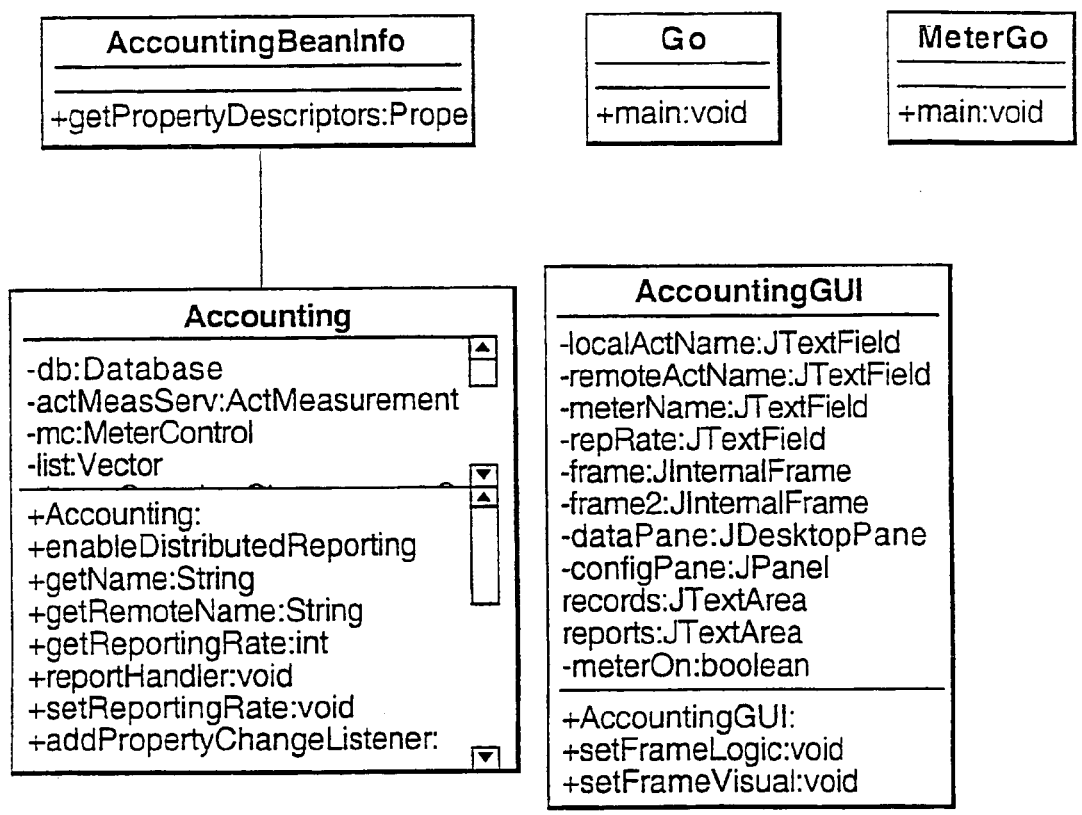
Figures 9, 10:
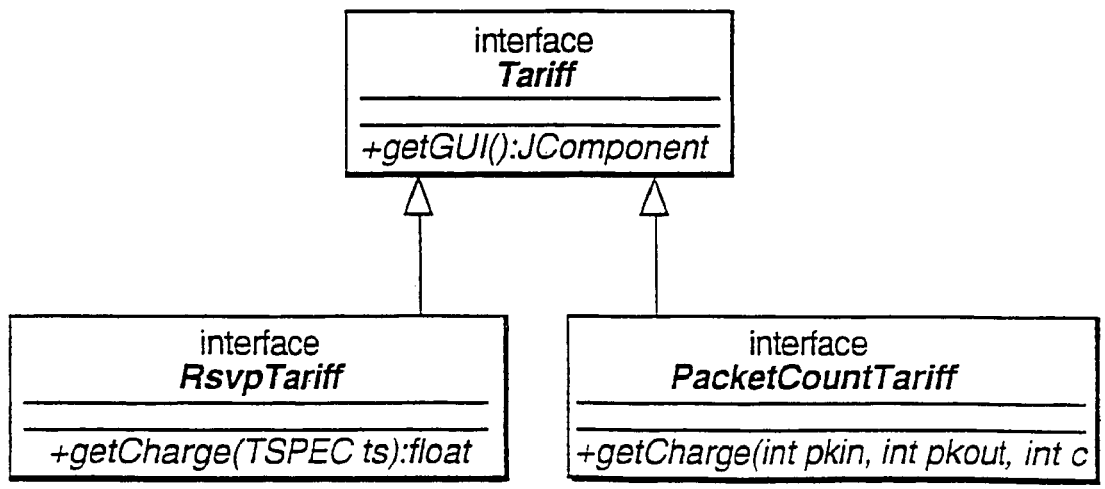
FIG. 9 is a diagram showing a graphic user interface (GUI) for use with the objects of FIGS. 8a to 8e.
FIG. 10 is a class diagram for software implementing tariff objects.

FIG. 7 shows how the main tariff determined by the network operator varies in time. In the Figure, curve A is the spot price calculated to reflect the loading of the network at any instant. Curve B is one of a number of different tariff bands. Different tariff bands have different volatilities, and the customer pays a premium for bands offering greater stability. Tariffs are communicated to the customer terminals using a hierarchy of channels carried by the network. An initial contract between a customer and a service provider a single channel address that might typically hold new announcements distributed some months apart (e.g. for contract variations or for new services specifying which second level channel to listen to for tariffs or for downloading new code to handle new tariff structures). The second level channels might deliver updates hours apart which simply announce the addresses of third level channels for the most volatile information. These third level channels may carry updates at intervals of less than a second. Prices for many services may be carried on one channel. For greatest efficiency, this one channel may be split into several channels at times of highest volatility, and re-aggregated into a single channel in more stable periods.

Tables 1 to 7 below list Java source code used to implement two different tariffs. The code of table 1 establishes the operations used for communication between a customer system and a tariff algorithm downloaded by the customer system. Table 2 shows a linear tariff algorithm, in which the tariff depends on the total of the packets sent and packets received by the customer together with a congestion parameter. Table 3 shows the code for generating the customer display in this case. Table 4 shows the code used to display the tariff at the network operator's server. Table 5 shows an exponential tariff algorithm. Table 6 generates the customer display and Table 7 the operator display for the exponential tariff algorithm. By downloading Java code to generate the user interface, that interface can be tailored to the requirements of the particular tariff, and can be adapted as the tariff changes.

Figure 11:
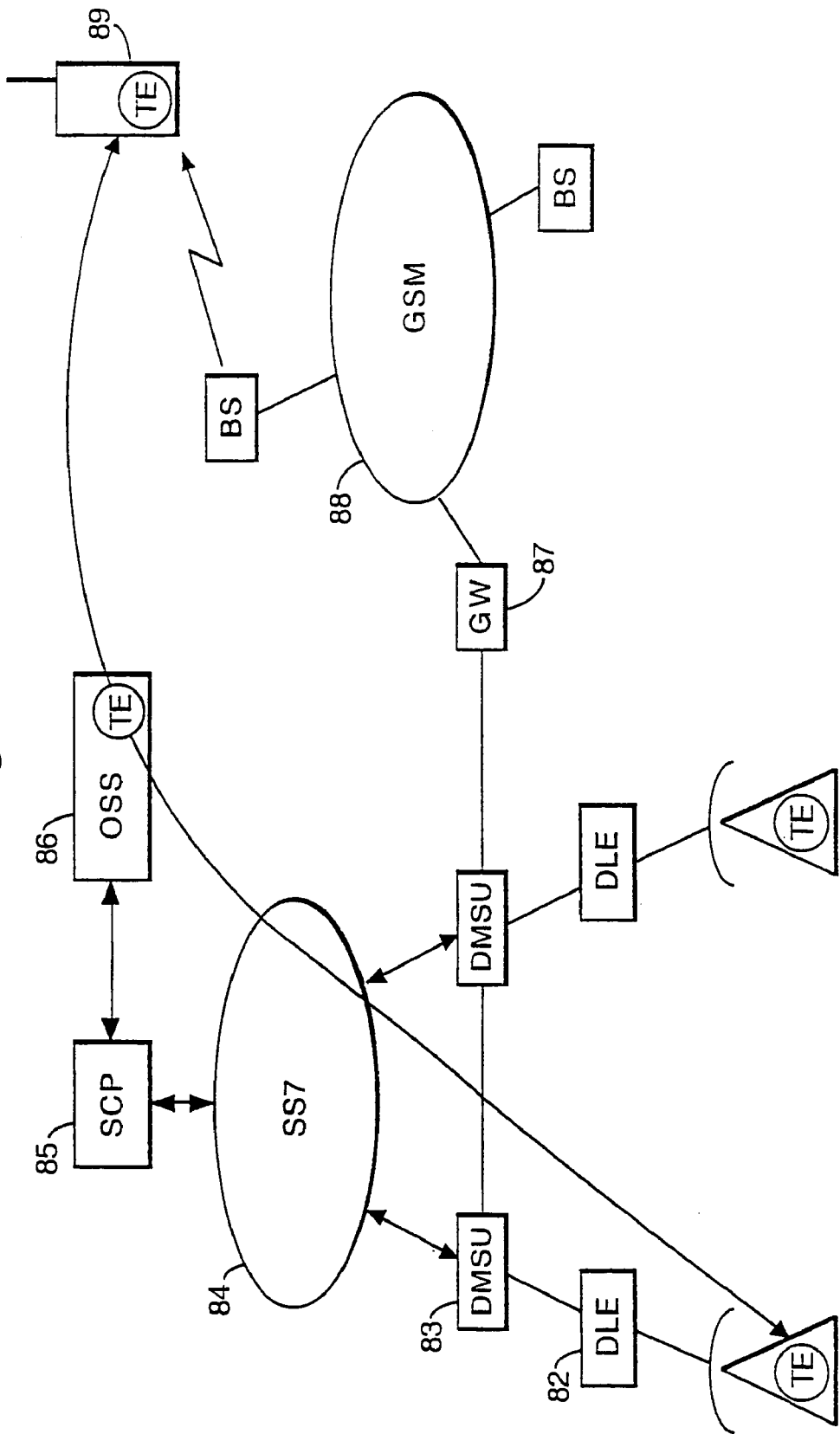
FIG. 11 is a diagram showing an alternative embodiment.

Although the examples so far described have been in the context of federated packet data networks, such as the Internet, many aspects of the invention can also be used with advantage in other types of network, such as in a circuit-switched PSTN (public switched telephony network). FIG. 11 shows an example of the invention applied in this context. In this network, customer terminals 81, which are in this example so-called intelligent phones, that is telephones incorporating a microprocessor and a data interface, are connected via local exchanges 82 and trunk exchanges 3 to the telephony networks. The trunk exchanges 83 are connected via a common channel SS7 (signalling system number 7) signalling network to a service control point 85 that is responsible for the execution of advanced call control functions. The service control point 85 is also connected to an operational support server 86 that is responsible for billing operations, and that, in this example, controls the setting of tariffs for the network. The OSS server and customer terminals include tariff entities (TE). The fixed PSTN network is also interconnected via a gateway 87 to a cellular GSM network 88. Base Stations BS in the cellular network communicate signals to intelligent mobile phones 89. In operation, network tariffs are distributed to customer terminals via the PSTN network and via the GSM network. Conveniently, the tariff may again take the form of Java functions which are executed on processors in the customer terminals. The Java functions may be streamed as Internet packets. In one implementation, these Internet packets may be distributed via the PSTN networks and GSM networks themselves. For example, the packets may be encapsulated and transported to the trunk exchanges using the MTP (message transport part) transport layer and may be communicated onwards to the customer terminals using out-of-band signalling. Alternatively, a separate data connection may be established between the OSS server and the customer terminals via the public internet. As in the examples above, the network operator monitors the loading of resources within the network and may transmit signals to the tariff entities in the customer terminals to change the tariff to reflect the scarceness or otherwise of relevant resources. Customer terminals may themselves monitor network loading and automatically generate variations in the tariffs. Usage of network resources may be measured locally by the customer terminals instead of conventional billing carried out within the network. The network operator may police the measurement of usage data by carrying out sampling, as described previously.

TABLE 1

```
// Generated by Together
package com.bt.jungle.lsma.charging.pricing;
import com.sun.java.swing.JComponent;
/**This establishes the operations used for
communication between the customer system
and the downloaded algorithm.
@author Mike Rizzo*/
public interface Tariff {
Jcomponenet getGUI( );
Float getPrice (int pkin, int pkout, int cng);
```

TABLE 2

```
package algorithms.linear;
import com.sun.java.swing.JComponent;
import com.sun.java.swing.JTextField;
```

TABLE 2-continued

```
import com.bt.jungle.lsma.charging.pricing.Tariff ;
public class LinearAlgorithm implements Tariff {
        private float rate;
        private LinearAlgorithnDisplay display;
        public LinearAlgorithm ( ) {
                display = new LinearAlgorithmDisplay ( );
                setRate (new Float(1));
        }
        public float getPrice (int pkin, int pkout, int cng) {
                return (pkin + pkout + cng) * rate;
        }
        public JComponent getGUI( ) { return display; }
        public void setRate (Float f) {
                rate = f.floatValue( ) ;
                display.setRate (rate) ;
        }
}
```

TABLE 3

```
// Generated by Together
package algorithms.linear;
import com.sun.java.swing.JPanel;
import com.sun.java.swing.JTextField;
import com.sun.java.swing.Box;
import com.sun.java.swing.JLabel;
public class LinearAlgorithmDisplay extends Jpanel {
        private JTextField tfRate = new JTextField (4);
        public LinearAlgorithmDisplay ( ) {
                Box vbox = Box.createVerticalBox ( ) ;
                Box hbox = Box.createHorizontalBox ( ) ;
                hbox.add (Box.createHorizontalGlue ( )) ;
                hbox.add (new Jlabel ("Rate:"));
                hbox.add (Box.createHorizontalGlue( ));
                hbox.add (tfRate);
                tfRate.setEditable (false);
                hbox.add (Box.createHorizontalGlue( ))
                vbox.add (hbox);
                add (vbox( ));
        }
        public void setRate (float f) {
                tfRate.setText (String.valueOf (f));
        }
}
```

TABLE 4

```
// Generated by Together
package algorithms.linear;
import com.sun.java.swing.*;
import java.awt.event.*;
import com.bt.jungle.lsma.charging.pricing.provider.*;
import com.bt.jungle.util.*;
public class LinearAlgorithmGUI extends Jpanel {
        private JTextField tfRate - new JTextField ( );
        private Tuning MessageListener tuningMessageListener;
        private final static String DEFAULT_RATE = "1.0";
        public LinearAlgorithmGUI (TuningMessageListener tml) {
                tuningMessageListener = tml;
                tfRate.setText (DEFAULT_RATE);
        Box vbox = Box.createVerticalBox( );
        Box hbox = Box.createHorizontalBox ( );
        hbox.add (new Jlabel ("Rate:"));
        hbox.add (Box.createHorizontalGlue( ));
        hbox.add (tf Rate);
        hbox.add (Box.createHorizontalGlue( ));
        hbox.add (hbox};
        JButton bTransmit = new JButton ("Transmit");
        bTransmit.addActionListener (
                new ActionListener ( ) {
                        public void actionPerformed (ActionEvent e) {
                                transmit ( ) ;
                        }
                }
```

TABLE 4-continued

```
        );
        hbox = Box.createHorizontalBox( );
        hbox.add. (Box.createHorizontalGlue( ));
        hbox.add (bTransmit);
        hbox.add (Box.createHorizontalGlue( ));
        vbox.add (hbox);
        add (vbox);
}
void transmit ( ) {
        try {
                Float f = new Float (tfRate.getText( ));
                Object args [ ]= new Object [1];
                Args [0] = f;
                TuningMessageListener.notify(
                        new invocation ("SetRate", args)
                );
        }
        catch (Exception e) {
                e.printStackTrace ( );
        }
}
}
```

TABLE 5

```
package algorithms.exp;
import com.sun.java.swing.JComponent;
import com.sun.java.swing.JTextField;
import com.sun.java.lsma.charging.pricing.Tariff;
public class ExpAlgorithm implements tariff {
        private float min;
        private float base;
        private float divisor;
        private ExpAlgorithmDisplay display( );
        public ExpAlgorithm( ) {
                display = new ExpAlgorithmDisplay ( );
                setMin (new Float (1));
                setBase (new Float (2));
                setDivisor (new Float (10));
        }
        public float getPrice (int pkin, int pkout, int cng) {
                return min + (float)math.pow (base,(pkin + pkout + cng)/
                divisor);
        }
        public JComponent getGUI( ) {return display; }
        public void setMin (Float f) {
                min = f.floatValue( );
                display.setMin(min);
        }
        public void setBase (Float f) {
                base = f.floatValue( );
                display.setBase(base);
        }
        public void set Divisor (Float f) {
                base = f.floatValue( );
                display.setBase (divisor);
        }
}
```

TABLE 6

```
// Generated by Together
package algorithms.exp;
import java.awt.GridLayout;
import com.sun.java.swing JPanel;
import com.sun.java.swing.JTextField;
import com.sun.java.swing.Box;
import com.sun.java.swing.JLabel;
public class ExpAlgorithmDisplay extends Jpanel {
        private JLabel tfDisplay = new JLabel ( );
        private float min, base, div;
        public ExpAlgorithmDisplay ( ) {
                add (tf Display);
        //              tfDisplay.setEditable (false);
```

TABLE 6-continued

```
                updateDisplay ( );
            }
            private void updateDisplay ( ) {
                tfDisplay.setText ("price = " + min + " +
                    " + base +
"^((pkin + pkout + cng)/" + div + ")");
            }
            public void setMin (float f) {
                min = f;
                updateDisplay ( );
            }
            public void setBase (float f) {
                base = f;
                updateDisplay ( );
            public void setDivisor (float f) {
                div = f;
                updateDisplay ( );
            }
    }
}
```

TABLE 7

```
// Generated by Together
package algorithms.exp;
import java.awt.GridLayout;
import com.sun.java.swing.*;
import java.awt.event.*;
import com.bt.jungle.lsma.charging.pricing.provider.*;
import com.bt.jungle.util.*;
public class ExpAlgorithmGUI extends Jpanel {
        private JTextField tfMin = new JTextField ( );
        private JTextField tfBase = new JtextFfield ( );
        private JTextField tfDivisor = new JTextField ( );
        private TuningMessageListener tuningMessageListener;
        private final static String DEFAULT__MIN = "1.0";
        private final static String DEFAULT__BASE = "2.0";
        private final static String DEFAULT__DIV = "10.0";
        public ExpAlgorithmGUI (TuningMessageListener tml) {
            tuningMessageListener = tml;
            tfMin.setText (DEFAULT__MIN);
            tfBase.setText (DEFAULT__BASE);
            tfDivisor.setText (DEFAULT__DIV);
            Box vbox = Box.createVerticalBox ( );
            vbox.add (new JLabel ("price = min + pow (base,
(pkin + pkout + cng)/divisor)"));
            vbox.add (Box.createVerticalGlue ( ));
            Jpanel panel = new JPanel (new GridLayout (3,2));
            panel.add (new JLabel ("Minimum"));
            panel.add (tfMin);
            tfMin.addActionListener (
                new ActionListener ( ) {
                    public void actionPerformed
                    (ActionEvent e) {
                        transmit ("setMin", tfMin);
                    }
                }
            };
            panel.add (new JLabel ("Base"));
            panel.add (tf Base)
            tfBase.addActionListener (
                new ActionListener ( ) {
                    public void actionPerformed
                    (ActionEvent e) {
                        transmit ("setBase", tfBase);
                    }
                }
            };
            panel.add (new JLabel ("Divisor"));
            panel.add (tfDivisor);
            tfDivisor.addActionListener (
                new ActionListner ( ) {
                    public void actionPerformed
                    (ActionEvent e) {
                        transmit ("setDivisor", tfDivisor);
                    }
                }
```

TABLE 7-continued

```
            );
            vbox.add (panel);
            add (vbox)
        }
        void transmit (String m, JTextField tf) {
            try {
                Float f = new Float (tf.getText ( ));
                Object args [ ] = new Object [1];
                args [0] = f;
                tuningMessageListener.notify(
                        new Invocation (m, args}
                );
            }
            catch (Exception e) {
                e.printStackTrace ( );
            }
        }
}
```

The invention claimed is:

1. A method of operating a communications network having a customer terminal which has a tariff at least temporarily stored therein, including:

automatically varying at the customer terminal, depending on network loading as detected at the customer terminal, the tariff for network usage by the customer terminal, the network loading being indicative of a current status of network congestion as detected at the customer terminal; and calculating a charge for the network usage by the customer terminal using the tariff.

2. A method according to claim 1, further including detecting at the customer terminal a network performance parameter which depends on network loading, and varying the tariff depending on the network performance parameter.

3. A method according to claim 2, in which the network is a packet network and the network performance parameter is the number of packets lost in transmission between a data source and the customer terminal.

4. A method according to claim 1, further including detecting a congestion signal at the customer terminal and varying the tariff in response to the congestion signal.

5. A method according to claim 4, further including reading a congestion signal at the customer terminal from a data packet received at the customer terminal.

6. A method according to claim 4, further including generating a congestion signal at a router in the network in response to the detection of congestion at the router.

7. A method according to claim 1, wherein automatically varying the tariff at the customer terminal includes making a first relatively smaller increase in the tariff when congestion is first detected, and making at least one further, relatively larger increase, if the congestion persists.

8. A method according to claim 1, further including programming a decision agent at the customer terminal with user-determined price criteria, and comparing a price calculated using the tariff with the price criteria.

9. A method according to claim 1, further including distributing a tariff algorithm via the communications network to a plurality of terminals and calculating at each terminal, using the tariff, a charge for network usage by the terminal.

10. A method according to claim 9, further comprising steps, carried out by a network operator, of:

intermittently sampling traffic between the customer terminal and the network, and as part of the sampling, recording network loading affecting the customer terminal; and for the sampled traffic, comparing a charge calculated by the customer terminal and an expected charge and detecting thereby any discrepancy.

11. A method according to claim 1, in which when the customer terminal detects congestion in data transmitted to the customer terminal from a data source via the network, the customer terminal returns a congestion notification signal to the data source.

12. A method according to claim 1, further including at a customer terminal, selecting a period of time for which the tariff is to be fixed and paying a premium depending on the duration of the period.

13. A method according to claim 1, in which the tariff is varied only if the terminal fails to reduce its output in response to detected congestion.

14. A method as in claim 1, wherein the customer terminal is one of a mobile telephone, an intelligent phone and a personal computing device.

15. A method according to claim 1, wherein:
said communications network has a global amount of networking loading;
said network loading detected at the customer terminal comprises a local observation of the network loading, the local observation of the network loading being indicative of the current status of network congestion as perceived by the customer terminal; and
said automatically varying the tariff includes automatically varying the tariff based on said local observation.

16. A method as in claim 15, wherein the customer terminal one of a mobile telephone, an intelligent phone and a personal computing device.

17. A method as in claim 15, wherein said detecting the local observation includes the customer terminal counting the number of data packets sent or received across a network interface with the customer terminal.

18. A communications network including:
means for detecting network loading locally at a customer terminal, the network loading being indicative of a current status of network congestion as detected locally at the customer terminal;
means responsive to the means for detecting arranged automatically to vary a tariff for network usage by the customer terminal, the tariff being at least temporarily stored by the customer terminal; and
means for calculating a charge for the network usage by the customer terminal using the tariff.

19. A method communication network as in claim 18, wherein the customer terminal is one of a mobile telephone, an intelligent phone and a personal computing device.

20. A customer terminal for use in a communications network, the customer terminal including:
means for detecting a local amount of loading of a network, which is indicative of a current status of network congestion perceived by the customer terminal, to which, in use, the customer terminal is connected;
means responsive to the means for detecting and arranged automatically to vary a tariff for network usage by the customer terminal, the tariff being at least temporarily stored by the customer terminal;
means for calculating a charge for the network usage by the customer terminal using the tariff.

21. The customer terminal in claim 20, wherein the customer terminal is one of a mobile telephone, an intelligent phone and a personal computing device.

22. A customer terminal for use in a communications network, the customer terminal including one or more processors arranged to carry out the following steps in sequence:
detecting a local amount of loading of resources in a network, which is indicative of a current status of network congestion perceived by the customer terminal, to which the customer terminal is connected; and
automatically varying in dependence on the detected loading a tariff for network usage by the customer terminal, the tariff being at least temporarily stored by the customer terminal;
calculating a charge tbr the network usage by the customer terminal using the tariff.

23. The customer terminal as in claim 22, wherein the customer terminal is one of a mobile telephone, an intelligent phone and a personal computing device.

* * * * *